DECIMAL TO BINARY TRANSLATORS

Original Filed Feb. 26, 1957 18 Sheets-Sheet 1

INVENTOR
A. C. REYNOLDS JR.
BY [signature]
ATTORNEY

INVENTOR
A. C. REYNOLDS JR.
BY [signature]
ATTORNEY

INVENTOR
A. C. REYNOLDS JR.
BY John A. Hall
ATTORNEY

INVENTOR
A. C. REYNOLDS JR.
BY John A. Hall
ATTORNEY

INVENTOR
A. C. REYNOLDS JR.
BY
ATTORNEY

INVENTOR
A. C. REYNOLDS JR.
BY John A. Hall
ATTORNEY

INVENTOR
A. C. REYNOLDS JR.
BY John A. Hall
ATTORNEY

FROM FIG. 15

INVENTOR
A. C. REYNOLDS JR.
BY John A. Hall
ATTORNEY

INVENTOR
A. C. REYNOLDS JR.
BY [signature]
ATTORNEY

INVENTOR
A. C. REYNOLDS JR.
BY
ATTORNEY

INVENTOR
A. C. REYNOLDS JR.
BY John A Hall
ATTORNEY

Feb. 13, 1962 A. C. REYNOLDS, JR 3,021,065

DECIMAL TO BINARY TRANSLATORS

Original Filed Feb. 26, 1957 18 Sheets-Sheet 12

INVENTOR
A. C. REYNOLDS JR.
BY John A. Hall
ATTORNEY

INVENTOR
A. C. REYNOLDS JR.
BY
ATTORNEY

INVENTOR
A. C. REYNOLDS JR.
BY John A. Hall
ATTORNEY

INVENTOR
A. C. REYNOLDS JR.
BY John A. Hall
ATTORNEY

Feb. 13, 1962 A. C. REYNOLDS, JR 3,021,065

DECIMAL TO BINARY TRANSLATORS

Original Filed Feb. 26, 1957 18 Sheets-Sheet 16

INVENTOR
A. C. REYNOLDS JR.
BY John A. Hall
ATTORNEY

DECIMAL TO BINARY TRANSLATORS

Original Filed Feb. 26, 1957 18 Sheets-Sheet 17

INVENTOR
A. C. REYNOLDS JR.
BY John A. Hall
ATTORNEY

INVENTOR
A.C. REYNOLDS JR.
BY [signature]
ATTORNEY

United States Patent Office 3,021,065
Patented Feb. 13, 1962

3,021,065

DECIMAL TO BINARY TRANSLATORS

Andrew Craig Reynolds, Jr., Waterbury, Conn., assignor to International Business Machines Corporation, New York, N.Y., a corporation of New York Original application Feb. 26, 1957, Ser. No. 642,509, now Patent No. 2,969,912, dated Jan. 31, 1961. Divided and this application Mar. 16, 1959, Ser. No. 799,733
7 Claims. (Cl. 235—155)

This is a division of application Serial Number 642,509, filed February 26, 1957, now Patent No. 2,969,912, for improvements in Error Detecting and Correcting Circuits.

This invention relates to means for detecting and for correcting errors in transmitted information and particularly relates to electronic translating means for changing the coded manifestations of decimal numbers into coded manifestations of equivalent binary numbers.

An object of the invention is to provide supervisory means for examining coded items of information, each accompanied by its unique checking items, and to delay the further processing movement thereof until a detected error can be corrected or until an alarm may be given through disabling means provided to report a non-correctable error.

The invention consists in general of a means for handling information in transit. Each item of information, which, by way of example, may be a ten digit number before entry into a processing machine, has certain check digits derived therefrom and these check digits are thereafter associated with this ten digit number and become part of the word. One group of these check digits consists of the decimal equivalent of the binary number formed by the selection of one of two distinguishable characteristics from each of the binary code representations of each of the decimal digits of the said ten digit number.

For purposes of explanation an example will be discussed in great detail throughout this specification. It will be assumed that the decimal number 7 6 3 5 9 1 2 8 3 0 is an item of information. This number expressed in binary decimal notation will be 0111 0110 0011 0101 1001 0001 0010
1000 0011 0000

The check digits may then be formed by selecting a corresponding bit from each of the above groups of bits, say the least significant position bit of each group, thus producing the binary number 1 0 1 1 1 1 1 0 0 1 0 which, translated into its decimal equivalent, becomes 0 7 5 4 and which, expressed in the binary decimal notation (for purposes which will appear hereinafter), becomes 0000 0111 0101 0100

Another unique check digit is derived by using the units digit of the sum of the digits of the said number, this being known as the sum modulo 10 of the number. The sum of $$7+6+3+5+9+1+2+8+3+0=44$$

so that the digit 4 is a derived check digit which along with the number 0754 is associated with the said number and which accompanies the said number in its movements through the processing machine. This item of information is precalculated so that when the number and its check digits are moved about they appear as

763591283007544 and this is expressed in the binary decimal code so that it forms a succession of fifteen four place codes which may be transmitted over a conventional four wire bit trunk. It will be assumed that the means for successively entering and transmitting each of these codes over such a four wire bit trunk in which the bits are simultaneously moved is entirely conventional.

The invention consists of means for successively gating these fifteen digits into fifteen digit stores for processing which comprises two principal operations. First the four check digits 0754 are translated into an equivalent binary number 1 0 1 1 1 1 0 0 1 0 and this is compared with the ten digit number which has actually been stored. Let us assume that in processing and by reason of some random error, the second digit 6 has become a 7. The comparison would then be between 0111 0111 0011 0101 1001 0001 0010 1000 0011 0000
1 0 1 1 1 1 0 0 1 0 and it will at once be apparent that there is an error in the second place.

At the same time and during the entry of the ten digits of this word, these ten digits are summed step by step and the sum of the digits of the number containing the error comes out to be 45 so that the sum modulo 10, which is 5, fails to compare with the last (fifteenth place) check digit 4.

These two check failures then immediately start a correcting operation. This consists of opening a gate to the second place digit store and the introduction thereinto of a train of correcting pulses and simultaneously therewith the introduction into the means for summing the digits of exactly the same number of pulses. This has the effect of advancing the record in the second place digit store successively through the values 8, 9, 0, 1, 2, 3, 4, 5 and 6 and simultaneously therewith of advancing the record in the summing device successively through the values 46, 47, 48, 49, 50, 51, 52, 53 and 54. When the last value 54 is reached, its units value 4 will compare exactly with the last place check digit and this will bring about a circuit change constituting a satisfaction signal which will stop further correction operations and will cause the corrected ten digit number to be transferred to a use circuit, such as an arithmetic section of a computer.

It should be noted that if no error had been detected the said ten digit item of information would have been immediately passed along to the said use circuit.

From the above discussion, and further by way of example, it will appear that with circuits and apparatus hereinabove set forth, an error can be detected only if it appears in the 1 bit place of some one of the digits forming the ten digit word, for otherwise the four digit check 0754 would remain the same while only the sum modulo 10 check digit would change. Since under these conditions there would be an absence of information necessary for the operation of the proper gate to the store containing the digit in error, this will be known as a non-correctable error and can only result in an alarm.

It may also be noted that where the four digit check number shows a deviation but the sum modulo 10 check digit shows no deviation, this also constitutes a non-correctable error for no information exists which will control the number of correction pulses which must be introduced into the store or stores containing an erroneous number. Where more than one erroneous decimal digit exists in store then a non-correctable error will be reported, for while the four digit check may lead to the discovery of the location of such multiple errors, the single digit sum modulo 10 check digit cannot report the differing magnitude of two or more errors.

While the system outlined above is particularly useful for the detection and correction of errors occurring in the transmission of data in pulse form, e.g. transmission of a number of pulses in seriatim corresponding to the value of a digit as in the telephone dial system, it is to be understood that the present invention contemplates means for detecting and correcting errors occurring in data transmitted in any digital form.

When transmitting the representation of a digit by a number of pulses corresponding to the value of a digit, an error changing the transmitted value by more than one is far less likely than an error changing the transmitted value by one. For example, when transmitting the digit by seven pulses in seriatim, it is far less likely that more than 8 or less than 6 pulses will be received than that 8 or 6 pulses will be received, the former constituting a double error while the latter constitutes a single error. The system outlined above is quite accurate for data transmitted in pulse form. This data, of course, may be subsequently translated into the binary coded decimal form or into any other coded form. If, however, the transmission is over four parallel wires in the binary coded decimal form, for example, then the check digits would be derived from parity or redundant bits generated in any manner well known in the art. Thus, the even parity check bit for the digit 7 might be formed as follows. In the binary coded decimal form, the digit 7 is represented as 0111 and the sum of the bits is 3, or odd, and thus a 1 is the even parity check bit. That is, 1 must be added to 3 to make the sum even. The binary check number derived from the example

7635912830 in this manner would thus be

1000011100 which binary number translates into the decimal number

0540

This number with the modulo 10 sum of the digits, 4, is now used in the same manner as explained above, and is transmitted as

763591283005404

It is to be noted that, in both the above examples, two mutually exclusive characteristics of each digit have been chosen as the basis for forming the binary check number, in the first case the odd or even characteristic of the decimal number and in the second case the odd or even characteristic of the sum of the bits used in the binary coded form of such decimal number. The binary check number so formed has been translated into the decimal system of notation for transmission with the information carrying digits. It is to be noted further that the invention is not limited to the decimal system of notation since the binary check number can be translated into any system of notation as desired, for example, base 36 or larger for handling both alphabetic and numeric data.

It is further to be noted that in the first example given a single random error in the 1 bit place may be specifically detected and corrected when the odd or even value of a decimal digit is the characteristic used as a control. Experience with the transmission of information particularly in great digital information handling networks such as the telephone system and the digital computers has shown that the occurrence of such single random errors is extremely rare and that the occurrence of a double error is so extraordinarily rare that provision for its detection is almost never made. However, the detection and correction of an error in the 1 bit place alone will detect only 25% of the random errors for which it is believed provision should be made for it is just as likely that a random error may occur in the 2 bit, the 4 bit, or the 8 bit place as it is that such an error may occur in the 1 bit place.

A feature of the invention therefore is a means for detecting and correcting a single error which may occur at random in any one of the four places of the binary-decimal code. Consider the digit 6 which is expressed in the binary-decimal code as 0110. The sum of the bits is even and a random error in any one of these four place will change the sum to odd. If, by way of example, through a random error this code is transmitted as 0010, an error in the 4 bit place, the change from odd to even would change the synthesized binary number from 1 0 0 0 0 1 1 1 0 0
to
1 1 0 0 0 1 1 1 0 0

Although this last number translates to the decimal number 0796, this translation is immaterial since it is the comparison of these two ten place binary numbers which is used to locate the error and since in the comparison circuits inequality appears in the second place (the 256 bit place) it is this digit as recorded at the distant end that must be corrected.

From a practical standpoint the code 0010 is equivalent to the decimal value 2. This changes the sum of the bits from even to odd and points out the location of an error as being in the second digital place. This will require the transmission of 4 correcting pulses to advance the register from 0010 through the value 0011 to the correct value 0110. The erroneous code 0010 which is transmitted being equal to the decimal value 2, will cause the sum of the decimal digits to be 40 instead of the proper sum 44, so that as the 4 correcting pulses are transmitted to the second place register, they also advance the modulo 10 summing device from the value 40 through the value 41 to the value 44, which gives the sum modulo 10 value of 4 and which compares exactly with the magnitude digit 4.

However, if through random error the code 0110 is sent as 0100, the value of the sum of the bits is changed from even to odd and the correction will take place by the transmission of 2 correcting pulses to advance the second place register from the value 0100 successively through the value 0101 to 0110. Since the code represents the decimal value 4, the sum of the digits calculated on the receipt of these codes will turn out to be 42 showing the sum modulo ten equal to 2 and since this does not compare to the digit 4 transmitted, these two correcting pulses will also run the modulo 10 summing device successively through the value 43 until it reaches the value 44 to exhibit the value 4 which compares with the magnitude check digit.

Again, let it be assumed that by random error, the code 0110 is sent as 0111. In this case the sum of the bits has been changed from even to odd. The four digit location code reports an error in the second place and the modulo ten device reports a sum of 45 or a value 5 instead of the value 4 carried by the magnitude code.

In this case nine correction pulses will be transmitted to run the second place register from the value 0111 successively through the values 1000, 1001, 0000, 0001, 0010, 0011, 0100, 0101 until it reaches the value 0110, the modulo 10 summing device advancing simultaneously from the value 45, through the values 46, 47, 48, 49, 50, 51, 52, 53 until it reaches the value 54.

By thus using a summing network to derive a parity pulse, that is, to differentiate between an even and an odd sum of the number of bits transmitted, it will be seen that 100% of the single errors which still produce a legitimate code may be detected and corrected.

Another feature of the invention then is a partiy bit generating circuit into which the bits of a code are entered and which in response thereto will produce an output bit when and only when the sum of the bits of the code is odd. While this device is shown as a means for determining the odd or even characteristic of the sum of the bits in a four place code, it is obvious that such a device may be constructed and arranged to respond to any other code having a greater number of code places and by the use of certain simple storage means, such as a ring counter, could be made to indicate these odd or even characteristics of a serial pulse code. This device then constitutes a means for determining by which one of two distinguishable characteristics a code is marked, and since at the far end a circuit of this nature may be arranged as a supervisory means, an expression of the incoming codes may be compared with a reconstructed expression of the codes offered for transmission at the near end. This supervisory circuit then may act to point out the location of an error and since a magnitude check digit is provided, the digit or code for a digit or other item of information may be readily corrected.

In this manner then a ten digit decimal number entailing the transmission of up to forty bits may be checked when received at some distant point and a single error in any one of the possible forty bits may be detected, located and corrected by the transmission therewith and over the same channel without change or addition of a simple five digit check number, the first four of which will locate the position of the error and the last of which will give the magnitude of the error.

It has been recognized that whereas a single error is very rare, a double error is so extremely rare that from a practical standpoint it is not worth while to provide more than means to detent it and to report it as an error. By means of this parity bit circuit it is to be noted in passing that triple errors in a single position may be actually detected and corrected. Thus, if the code 0110 contains a triple error in the 1, the 2 and 4 bit places and becomes transmitted as 0001, then the sum of the bits is changed from even to odd and the parity bit is developed with the same result as hereinabove pointed out, that is, the sum of the decimal digits becomes 39 and an error is pointed out as having occurred in the second place. Thereupon the transmission of five correcting pulses will change the sum of the digits to 44 thus producing the magnitude check digit 4 and running the registration of the digit from the mutilated value 0001 to the correct value 0110.

In the circuitry of the present invention, positive pulses are those used for the transmission of information. The registers, used as bit stores, are conventional capacity coupled flip-flop or trigger devices which respond to negative pulses. However, through the proper engineering arrangements, these triggers will respond to the trailing edge of a positive pulse which is essentially negative in character so it is to be noted hereinafter that the various bit stores described will respond to the positive pulses transmitted thereto and that such response occurs at the end or termination of each such positive pulse and that this time factor is important to the understanding of the operations of the device of the present invention. Some of the consequences of the setting of the bit stores upon the termination of, rather than during the existence of, a pulse will be pointed out in detail hereinafter.

A feature of the invention is a storage unit which may be set in either of two ways, that is, by the simultaneous entry therein of the combinations of the 1, 2, 4 and 8 bits to express in pure binary code any given decimal number and, alternatively, by the serial entry therein of a train of pulses to advance the value of the decimal digit expressed thereby. By way of example, it will be shown hereinafter that such storage unit may be set in one operation to express the decimal digit 7 by the simultaneous entry of the 1, 2 and 4 bits and that later through the serial entry of nine pulses it may be run through the expression of the decimal digits 8, 9, 0, 1, 2, 3, 4, 5 and 6. Since no output carry is provided from this storage unit to the next storage unit, such next storage unit will not be affected upon the change from the expression of the decimal digit 9 to the decimal digit 0. By such means it will be shown, by way of example, that when it is found that a given register is set to express the decimal digit 7 erroneously it may be corrected by the sequential entry of nine pulses to change the expression to a 6, other means being provided to detect the expression when it has reached the proper value.

Another feature of the invention is a decimal digit accumulator capable of accumulating a sum characterized by decimal values but expressed in terms of binary numbers.

The decimal digit accumulator is one which may be called upon to accumulate a sum as great as 99, that is, the sum of ten digits each equal to nine with the later addition of another possible nine bits in the process of correction. Since the digits are entered each in pure binary code, this means that at least seven bit storage units must be provided to store numbers from 1(0000001) to 99 (1100011). These will be used for the storage of 1, 2, 4, 8, 16, 32 and 64 bits.

Direct entries may be made into the 1 bit, 2 bit, 4 bit and 8 bit stores, but the filling of the 16 bit, 32 bit and 64 bit stores will be purely by way of carry. The complete accumulation will always be present in these bit stores, but only the units digit of such accumulation will appear at the output of the device. Thus, if the accumulation produced by summing the decimal digits 7 7 3 5 9 1 2 8 3 and 0 is present, the sum 45 will be expressed by the operation of the 1, 4, 8 and 32 bit stores (0101101) and the decimal digit 5, the units digit of 45 will be expressed in binary code (0101) at the output of the device. What may be termed a network weight of 5 will be produced by the 1 and 4 bit stores and a network weight of 0 will be produced by the 8 and 32 bit stores, these being combined by an AND circuit expressing the decimal digit 5 which is thereupon translated into UP conditions on the $\overline{8}$, 4, $\overline{2}$ and 1 bit outgoing circuits leading to the sum modulo 10 comparison circuits.

When, as explained herein by way of example, nine separate correction pulses are introduced into this accumulator, the actual accumulation will reach the value 54 and will be expressed by the 2, 4, 16 and 32 bit stores (0110110), whereupon the network weight 6 will be produced by the 2 and 4 bit stores and the network weight 8 will be produced by the 16 and 32 bit stores, these two weights being combined by an AND circuit expressing the decimal digit 4 (the units digit of 14, the sum of 6 and 8) which is thereupon translated into UP conditions on the $\overline{8}$, 4, $\overline{2}$ and $\overline{1}$ bit outgoing circuits leading to the sum modulo 10 comparison circuits.

A feature of the invention may then be stated as an accumulator which will accumulate decimal values entered by their binary code expressions in the bit stores of a binary coded sum storage device. It is to be noted that the accumulator will produce a sum either from the entry of decimal numbers greater than 1 or from the successive entry of a plurality of 1 bits.

Another feature of this sum modulo 10 accumulator is a means for reducing the sum value into a pair of purely decimal numbers whose sum in turn will have the same units digit as the said sum value and which units value expressed in decimal terms may then be translated into its equivalent pure binary code. The sum modulo ten accumulator thus accumulates in accordance with the principles of binary addition, reduces its sum into a pair of decimal values which it then sums in accordance with the principles of decimal addition and finally selects the units digit of this decimal sum and translates it to a binary code.

Another feature of the invention is a decimal to binary translator having a plurality of output stores which are employed since the digits of the decimal number are separately entered but the translation of the whole must be completely available after all have been entered. The output of the translator also includes delay means, for carries are produced during the process of the successive entries of the decimal digits.

No input stores are employed since the incoming decimal digits are expressed in binary code and are translated from an expression of 1, 2, 4 and 8 bits simultaneously transmitted to a signal on a single one of nine output leads corresponding to the decimal values 1 to 9 respectively. Since the translator is virtually an accumulator in which the values are successively entered and where carries are produced, the inputs must be transitory and must properly enter the translating matrix as a single signal instead of a code.

A feature of the invention may then be stated as a means for converting a succession of four decimal digits each expressed in binary code to a ten place binary number.

Another feature of the invention is a digit position comparison circuit by which a comparison is made between an expression for each of the digits of a word in its true form and a similar expression for each digit of a word as it is possibly erroneously recorded whereby means for the correction of a digit thus found to be in error may be operated.

In the complete organization of the components above described, the said digit position comparison circuit thus discovers and points out the particular digit which is in error and the sum modulo 10 comparison circuit monitors the correction thereof.

Hereinabove and for the purposes of setting forth a clear statement of the invention, a specific example has been described. The invention in its broad aspects, however, may be completely generalized, as follows.

Let a group of $n$ symbols have $m$ characteristics. Let each characteristic be uniquely represented by a number $0 \leqq k \leqq m-1$. Then an ordered number in the number system having $m$ for base can be formed for each ordering of the group of $n$ symbols such that the number to the base $m$ in each position indicates the presence of a given characteristic in the corresponding position in the ordering of the $n$ symbols. Let the number in the base system $m$ be translated into its unique value in the base system $n$. The number so formed becomes a position check number base $n$. Let each symbol of the group of $n$ different symbols be assigned a unique numerical value $0 = j = n-1$. Let the sum modulo $n$ of each ordering of the $n$ symbols be formed. The digit base $n$ so formed becomes the error correcting digit. The check number composed of the position check number and the error correcting digit form a single error correcting, multiple error detecting check system.

The generalization shows that more than two characteristics can be employed as a position check, thereby increasing the accuracy of the means employed depending upon the situation to be checked. It also shows that the system can be expanded to information other than numeric. For example, alphabetic information can be checked using a base 26 system; alphabetic and numeric by using a base 36 system; alphabetic numeric and special symbols by using a base (36 + the number of special symbols) system. The generalization also shows that the selection and assigning of $m$ characteristics to the $n$ symbols is completely arbitrary both as to number and description of the characteristics.

Another feature of the invention is a comparison circuit for comparing one number expressed in binary code with another similar number. For each bit there is provided a pair of coincidence circuits each having two inputs leading from the bit output lead of one number and the no bit output lead of the other number. By this means coincidence will be produced in one or the other of said coincidence circuit only when there is a mismatch between the two numbers in this particular code place.

A ten place binary number has code places for bits valued $2^9$, $2^8$, $2^7$, $2^6$, $2^5$, $2^4$, $2^3$, $2^2$, $2^1$ and $2^0$, otherwise known as the 512, 256, 128, 64, 32, 16, 8, 4, 2 and 1 bits. In the example set forth herein where an error appeared in the second place (reading from the left) such error would be in the 256 bit place and of the two coincidence circuits, one controlled by the 256 bit of one number and the not 256 bit of the other and the second controlled by the not 256 bit of the one number and the 256 bit of the other number, one would produce an output. By such double check means not only may a mismatch in the comparison of two numbers be detected but the exact location may be pointed out.

Another feature of the invention is a matrix for comparing one decimal digit with another, bit by bit in the expression of such digits by their binary codes. In one form of such a matrix an output signal will be produced only when there is a perfect match between the two digits and this may be used to produce a satisfaction signal. In another form of such a matrix the complete absence of an output signal is produced only when there is a perfect match between the two digits or, in other words, an output signal is produced and maintained until such a perfect match is attained.

A feature of the invention, then, is a double checking means employing one each of the said two forms of matching circuit whereby the detection of an error becomes inescapable.

Other features will appear hereinafter.

The drawings consist of eighteen sheets having thirty-four figures as follows.

Figures 18, 19:
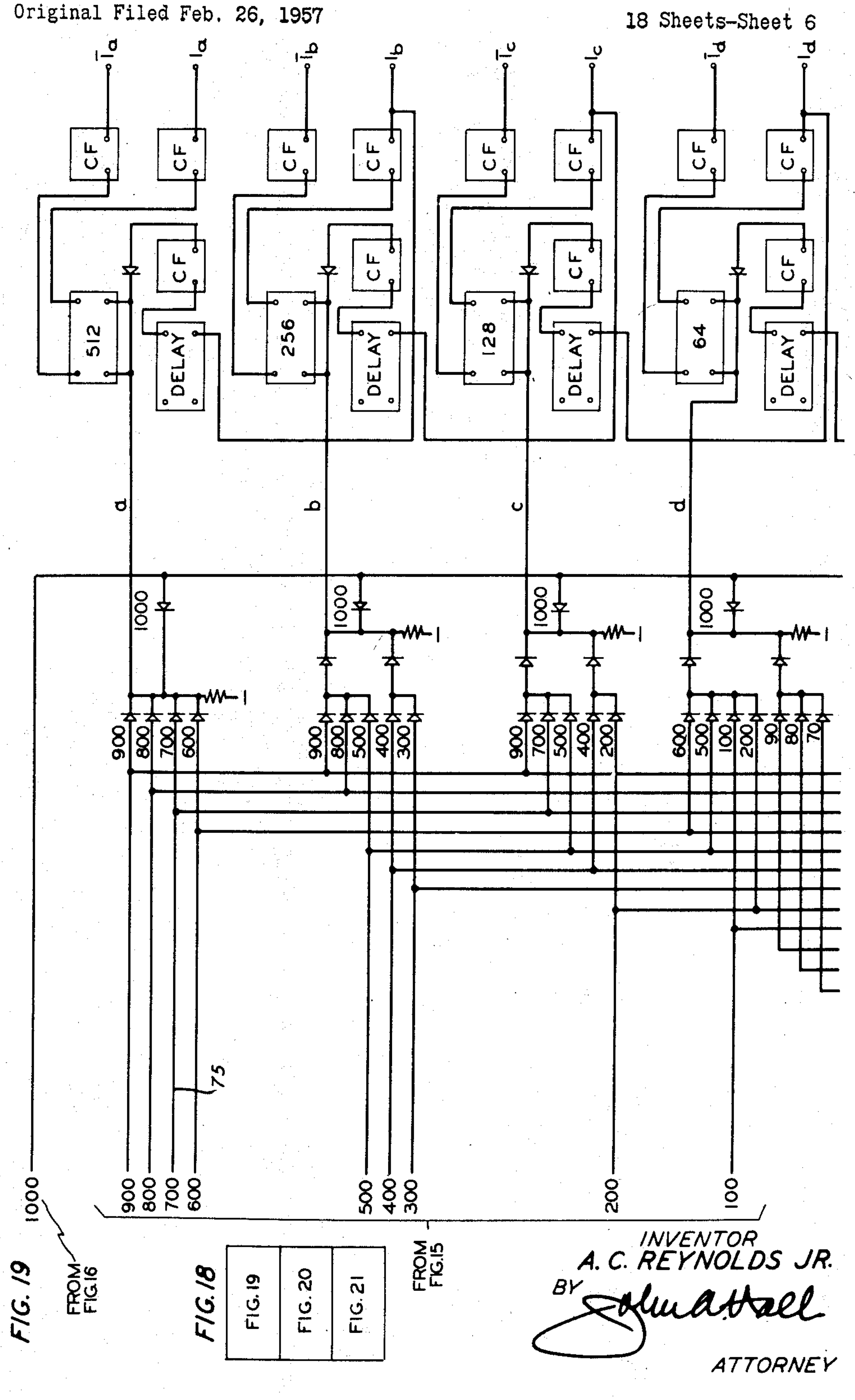
Figure 20:
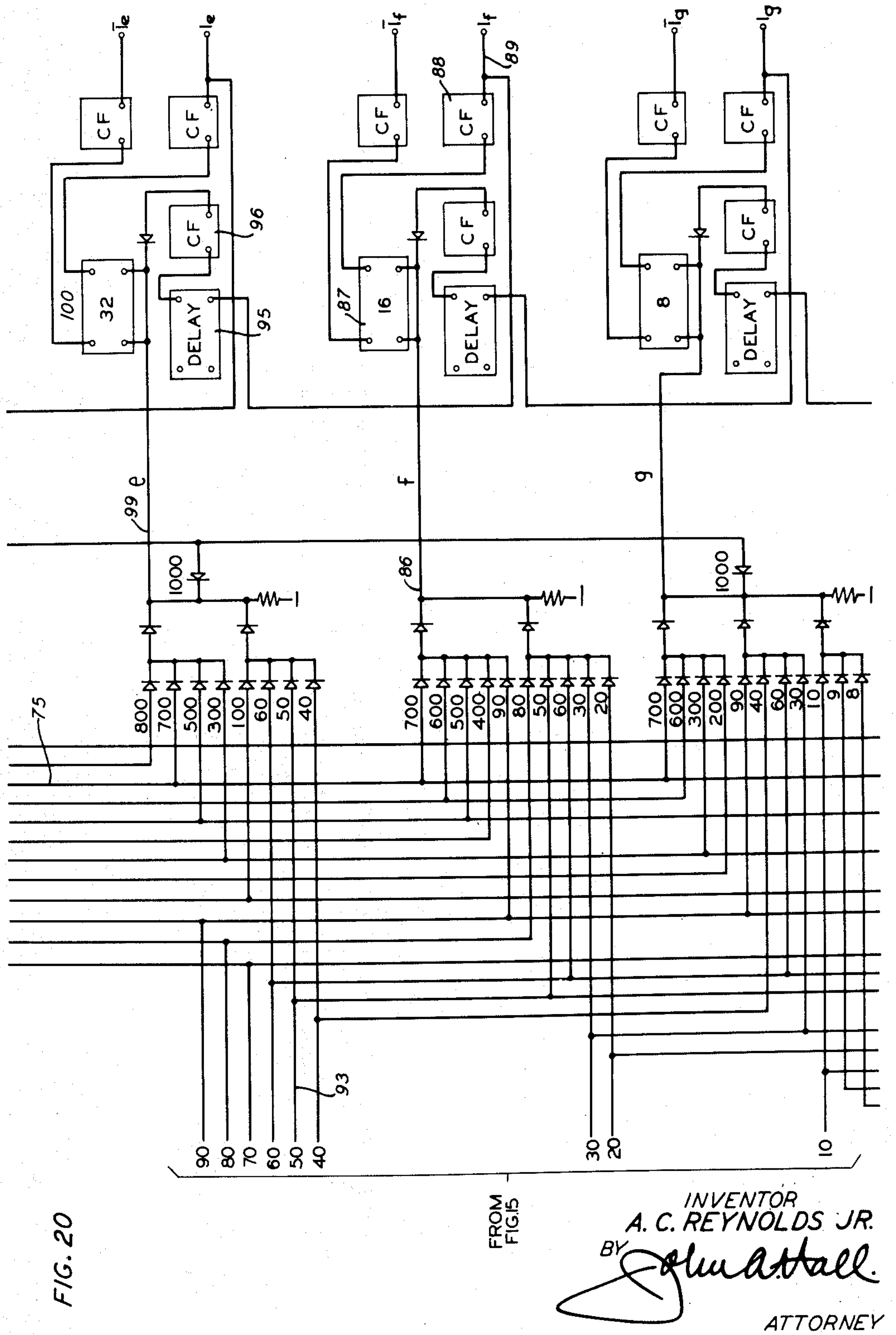
Figure 21:
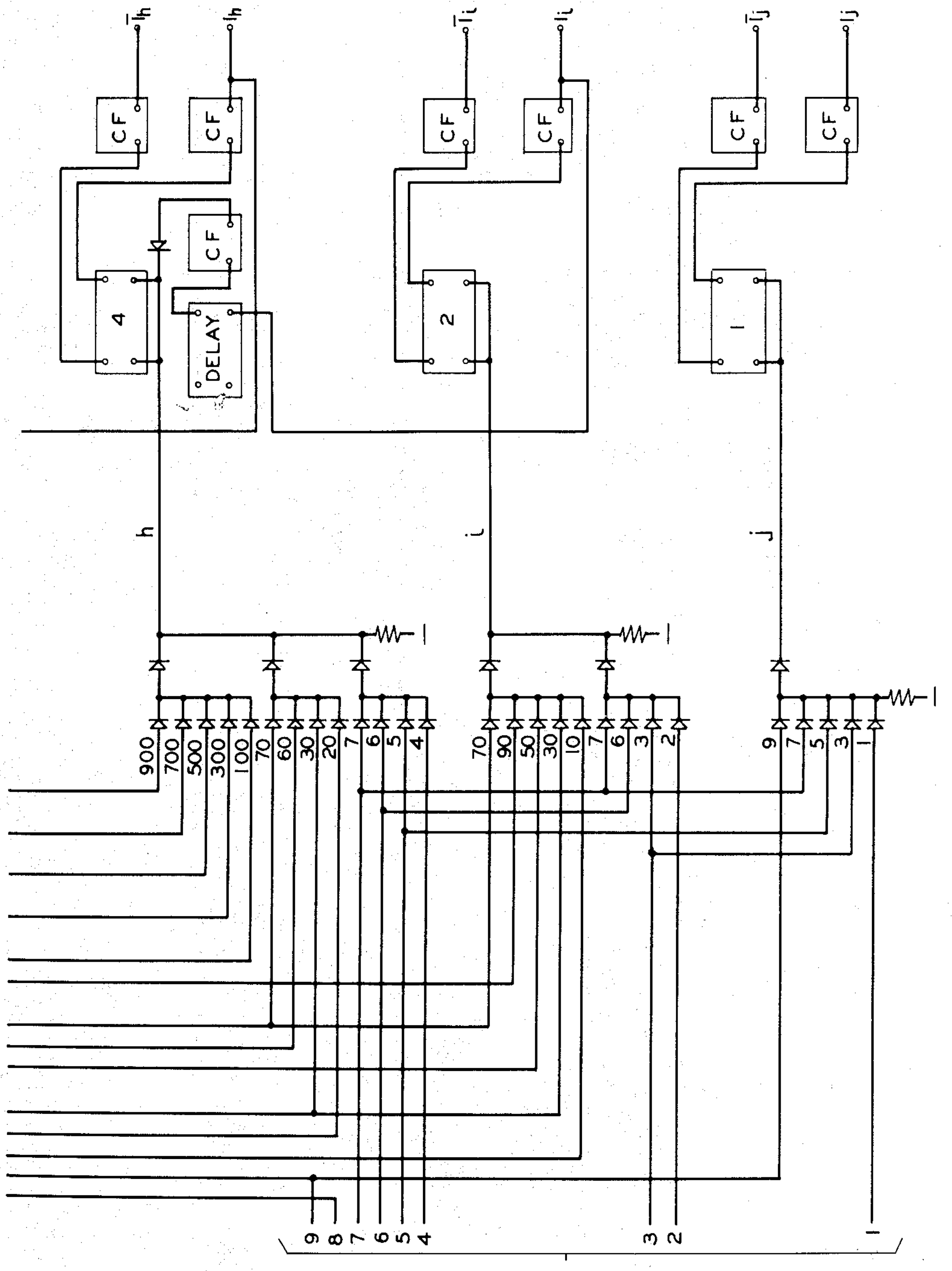
Figures 22, 23:
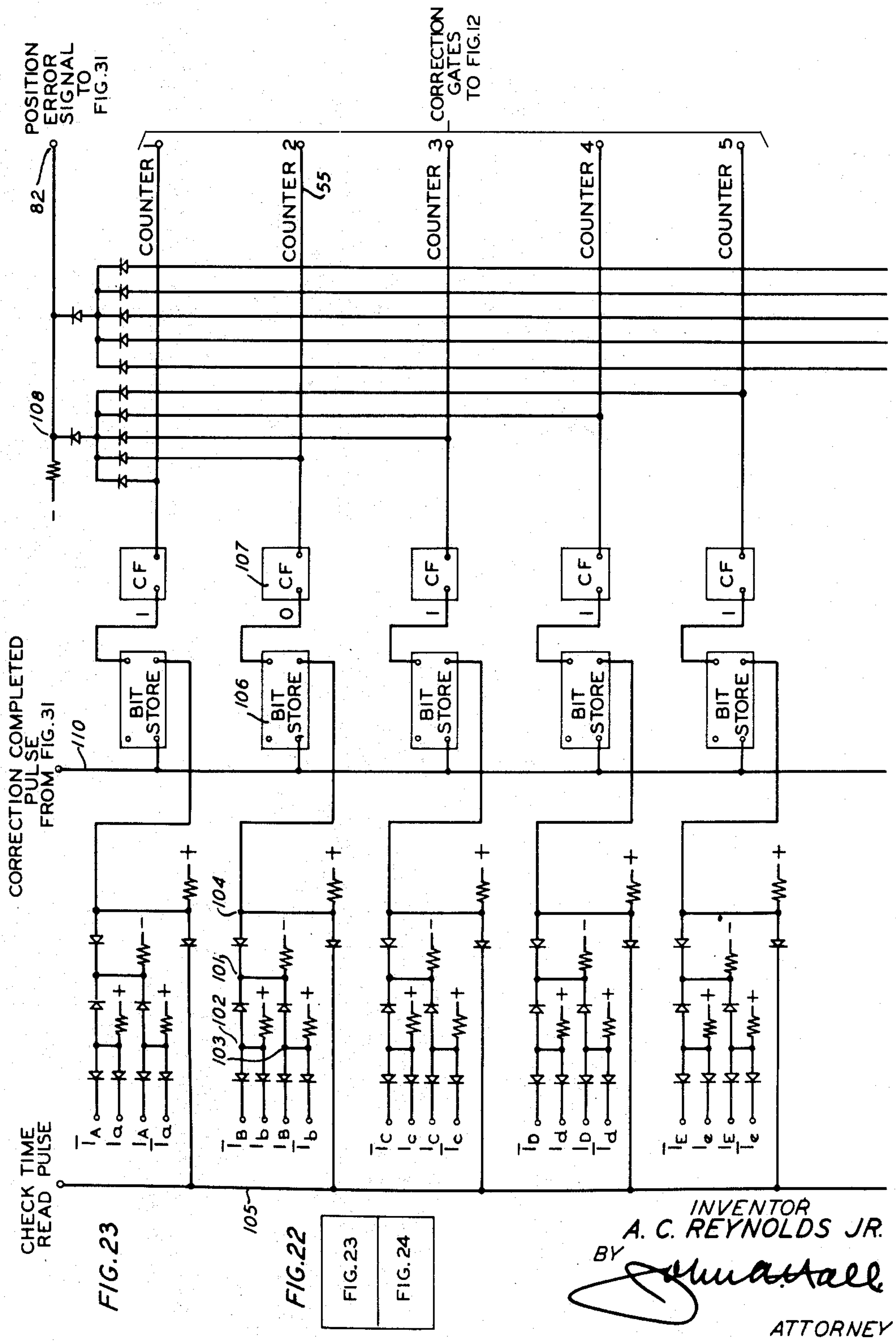
Figure 24:
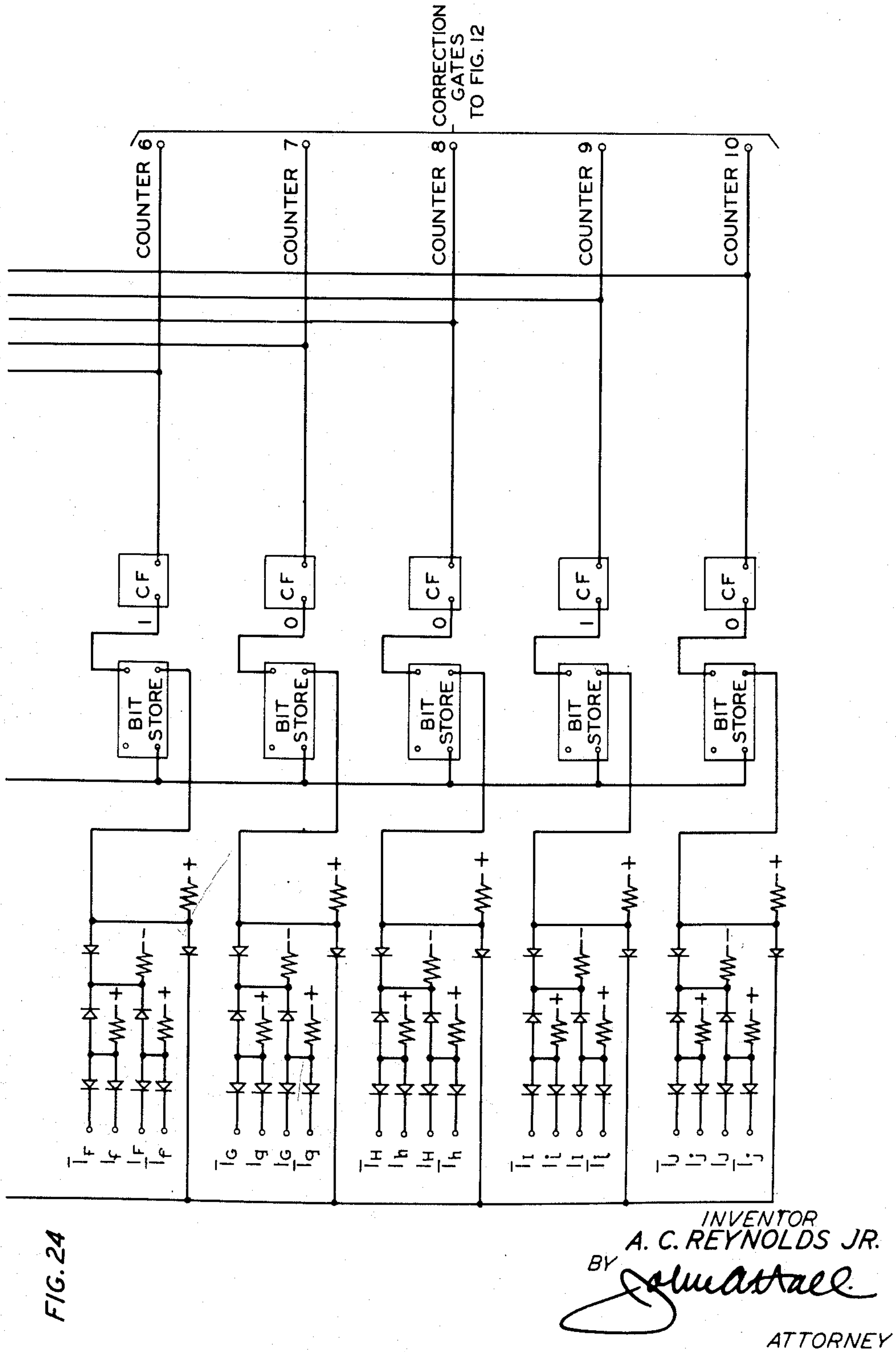
Figure 28:
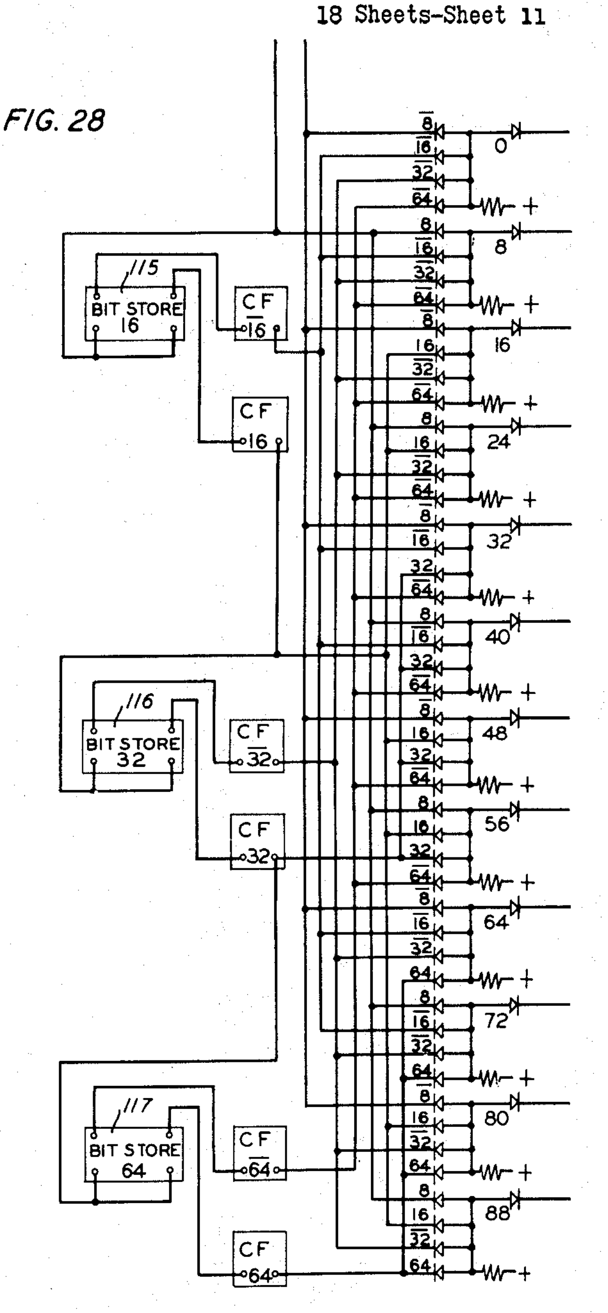
Figure 25:
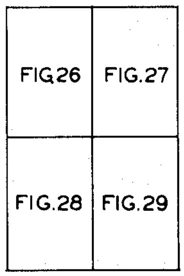
Figure 31:
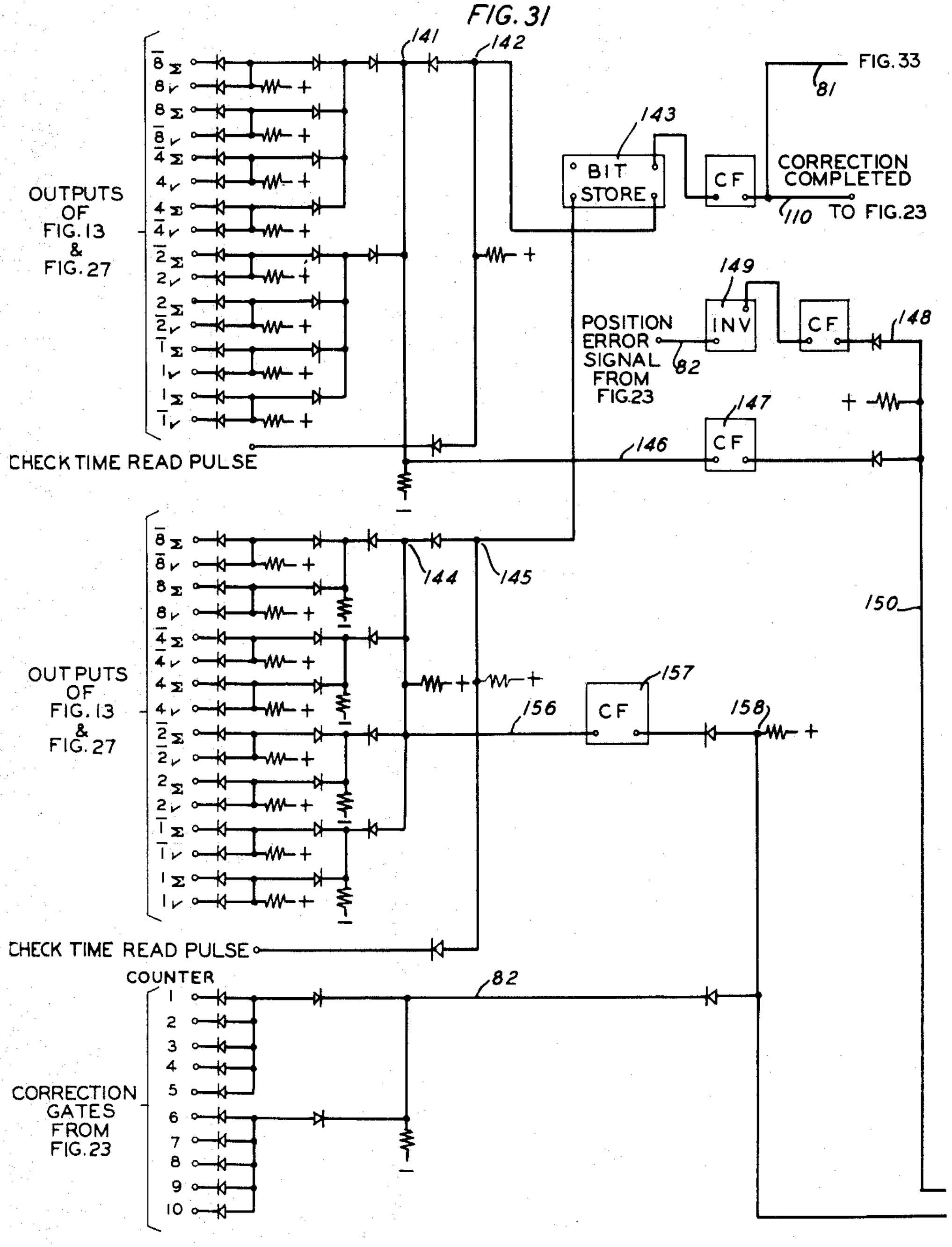
Figure 30:
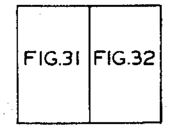
Figure 32:
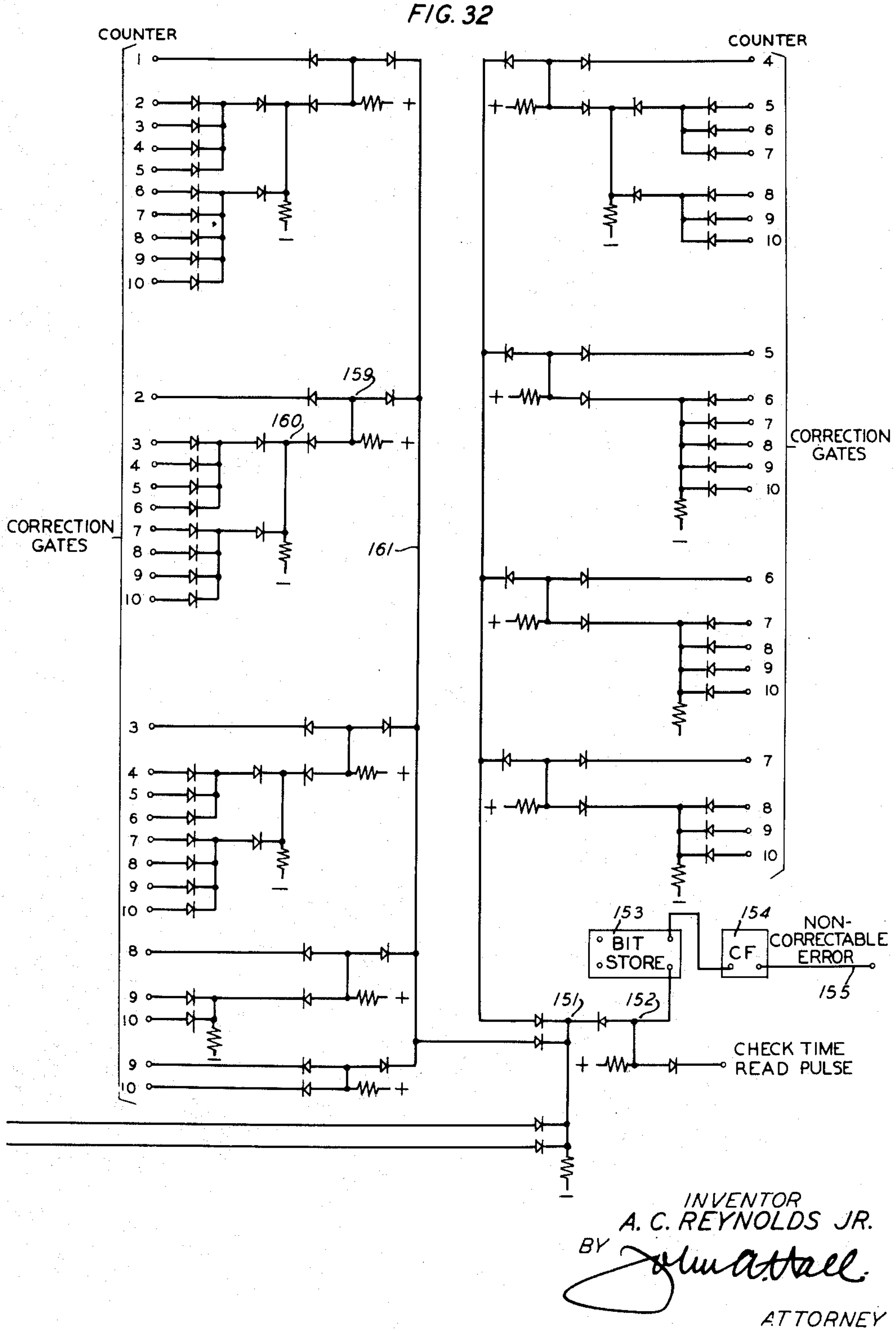
Figure 33:
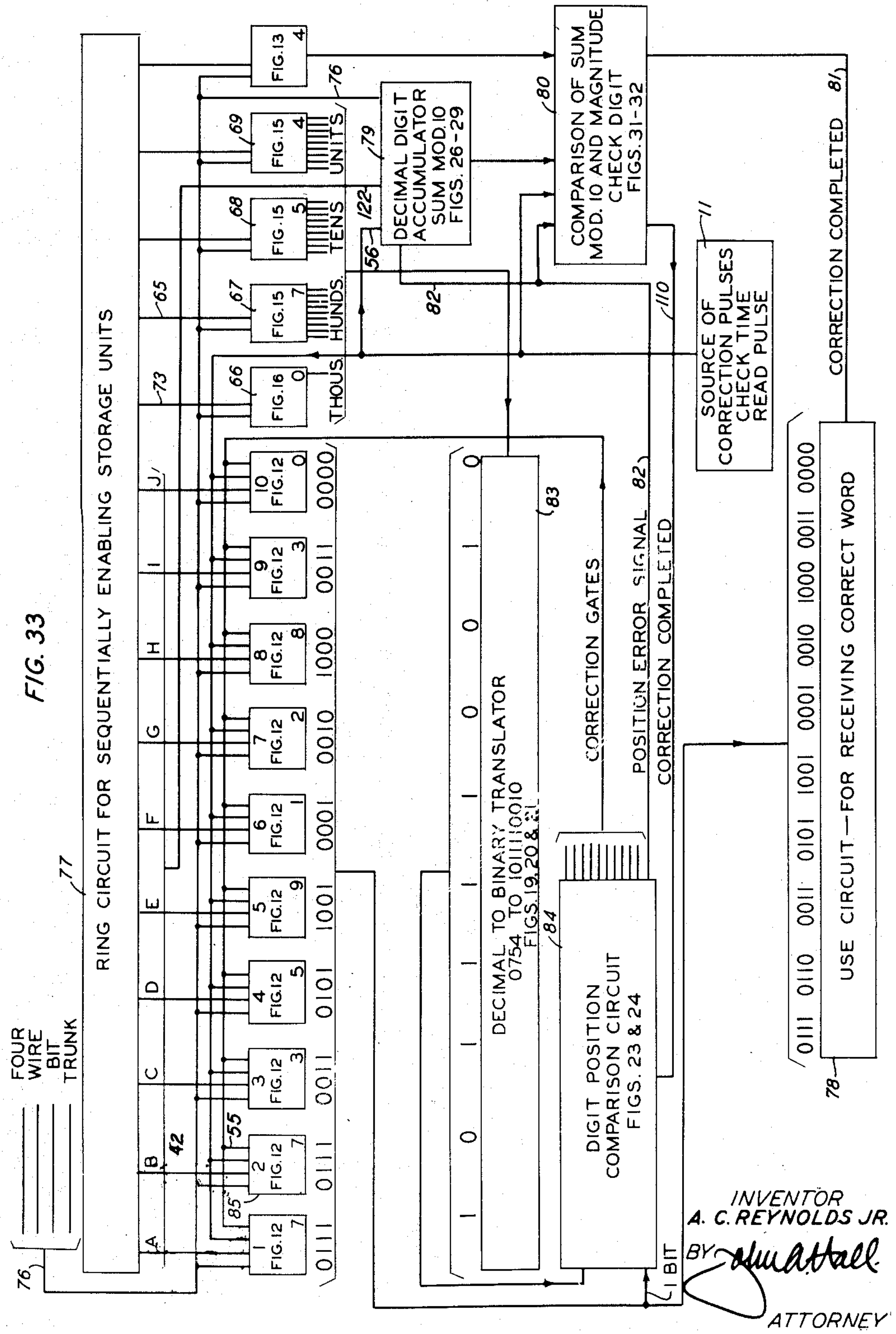
Figure 34:
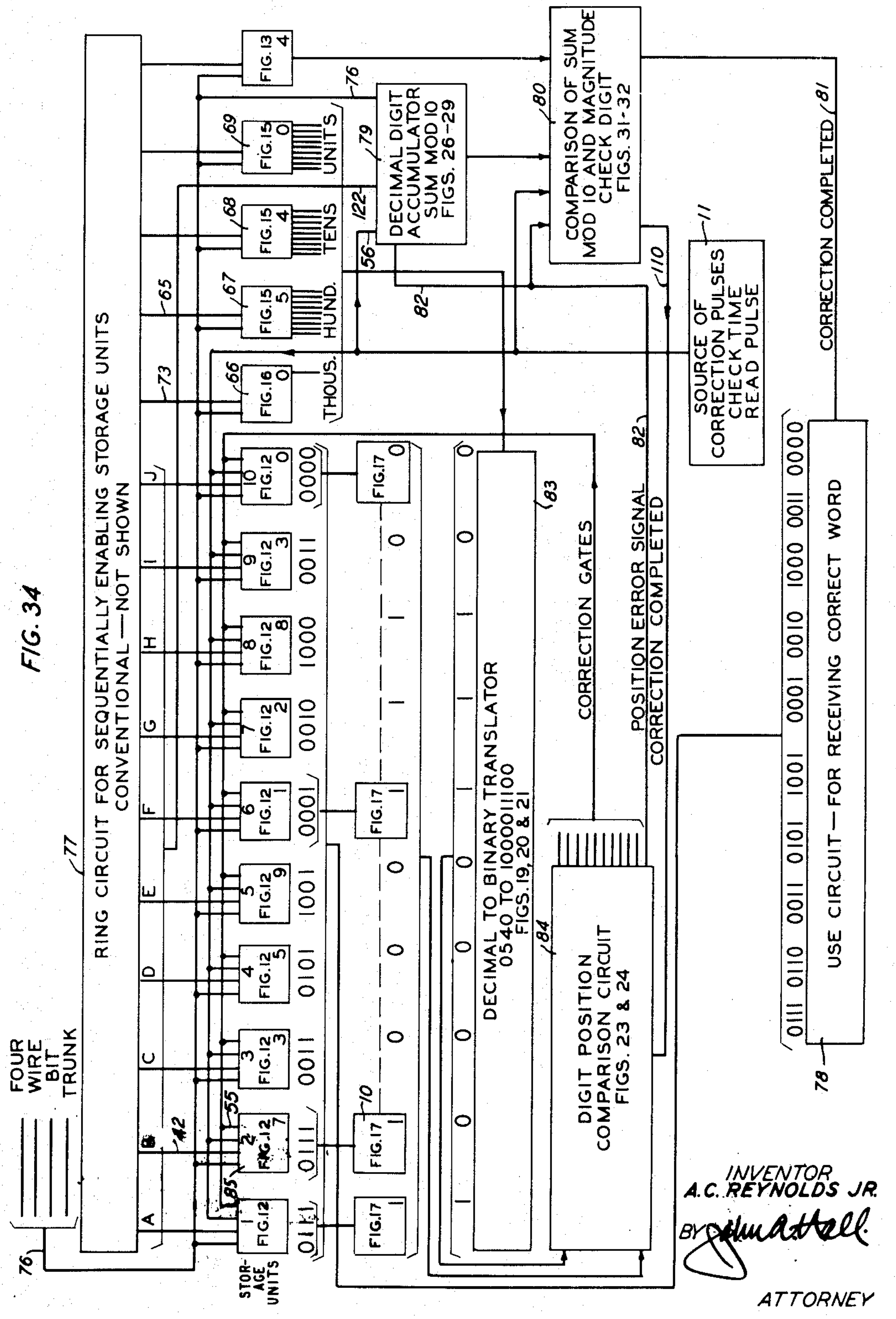

FIG. 18, on the same sheet with FIG. 19, is a block diagram showing how FIGS. 19, 20 and 21 may be placed to make a complete schematic circuit diagram of the decimal to binary translator indicated as component 83 in the flow chart of FIG. 33;

FIGS. 19, 20 and 21 are each portions of a schematic circuit diagram showing how signals of a single (1000) thousands place decimal number wire, nine (100 to 900 inclusive) hundreds place decimal number wires, nine (10 to 90 inclusive) tens place decimal number wires, and nine (1 to 9 inclusive) units place decimal number wires may be forwarded through the maze of a matrix to emerge as the bits of a ten place binary number;

FIG. 22, on the same sheet with FIG. 23, is a block diagram showing how FIGS. 23 and 24 may be placed to make a complete schematic circuit diagram of a bit comparison circuit (indicated as component 84 in FIG. 15) to compare selected bits of the ten registered digits with the bits produced by the decimal to binary translator of FIGS. 19, 20 and 21;

FIGS. 23 and 24 are each portions of a schematic circuit diagram of a bit comparison circuit to compare a reconstructed binary number with a binary number made up of selected characteristics of the registered ten decimal digits;

FIG. 25, on the same sheet with FIG. 28, is a block diagram showing how FIGS. 26 to 29 inclusive may be placed to make a complete schematic circuit diagram of a sum modulo 10 computer, shown as component 79 in the flow chart FIG. 33;

FIGS. 26 to 29 inclusive, placed as indicated in FIG. 25, make a schematic circuit diagram of the device known herein as the sum modulo 10 accumulator, which has an input register of six bit stores to store 1, 2, 4, 8, 16, 32 and 64 bits as through successive entries a plurality of decimal digits each expressed in binary code and the later entries of a succession of 1 bits for correction are accumulated and which will produce and transmit as its output a signal decimal digit expressed in binary code, said single digit output being the units decimal digit of the accumulated sum;

FIG. 30 on the same sheet wth FIG. 31 is a block diagram showing how FIGS. 31 and 32 may be placed to make a complete circuit diagram of a bit comparison circuit;

FIGS. 31 and 32 placed as shown in FIG. 30 make a complete schematic circuit diagram of a means for comparing the single check digit expressing the magnitude of the principal number with the accumulated sum modulo 10 value of the digits thereof as they are entered into the storage devices of the present system, and the means for signaling the correctable and the non-correctable errors;

FIG. 33 is partly a block diagram and partly a flow chart by which the cooperative functioning of the various components may be explained, the system depicted here being one in which the odd or even characteristics of the decimal digits is considered; and FIG. 34 is a similar diagram in which the parity bit forming network is introduced and by which the odd or even characteristics of the sum of the bits by which each decimal digit is expressed, is employed to form the position check digits.

In order to have a clear understanding of the operation of the circuits of the present invention, it will be helpful to have a general understanding of certain logical circuit electronic components and certain terminology employed in connection with these components.

Attention is called to the Phelps Patent 2,584,811 issued February 5, 1952, which shows an electronic counting circuit basically the same as a digit storing device used herein and which is subject to digit correction. Any one of ten decimal digits expressed in the 1, 2, 4 and 8 binary bit code may be stored in such a device and if the rest of the circuitry discovers an error in such a stored digit, it may be corrected by transmitting thereinto a train of pulses which step by step advances the value of the stored digit, without carry of a tens digit produced, until the stored digit reaches its proper value. It will be shown hereinafter how a digit 7 stored in error for a digit 6 may be corrected by adding a value 1 nine times in succession thus running the output value from the value 7 successively through the values 8, 9, 0, 1, 2, 3, 4, 5 and 6 so that as this last value 6 appears certain detecting circuits will recognize the fact that the proper value has been reached and the error has been rectified.

Attention is also called to the Hamilton et al. Patent 2,636,672 issued April 18, 1953, and which contains a disclosure of a typical cancel or reset circuit by which, at the end of an operation, all the operated triggers, flip-flops or storage devices may be returned to normal awaiting another operation of the device in which they are incorporated.

The specifications and subject matter of these patents are incorporated herein as part of this application as though they were fully set forth in the body of the specification.

In the following description certain terms are used and many basic circuit components are mentioned, all of which are set forth in the prior art and some of which are shortly described as follows.

UP and DOWN refer to potentials. In this electronic maze, each component, such for instance as a tube circuit, is arranged to be active when the potential on its control conductor is UP and inactive when such potential is DOWN. Generally, as in a cathode follower circuit, when the potential on an input terminal is UP, the potential on the output terminal is UP and likewise, when the potential on the input terminal is DOWN, the potential on the output terminal is DOWN. It may be stated, merely by way of example, that a potential of plus 5 volts or more will constitute an UP condition and a potential of minus 30 volts or less will constitute a DOWN condition. UP means that the voltage present at a particular point is positive with respect to ground and DOWN means that the voltage present is negative with respect to ground. If the control grid of a vacuum tube is referred to as DOWN, it generally means that the voltage at that control grid is below the cutoff value of the vacuum tube.

Numerous coincidence circuits are employed herein. An AND circuit refers to a circuit which is operable to produce an UP condition on its output terminal only when all of its input terminals are UP. Such an AND circuit may be constructed of a number of diodes all poled to hold the output terminal DOWN until all of the inputs are UP or it may be constructed of a tube such as a pentode where the control grid and the suppressor grid must both be UP to produce conduction in the tube. An OR circuit refers to a circuit operable to produce an UP condition on its output terminal when any one or another or more of its input terminals are UP.

In the logical diagrams forming part of the present disclosure an AND circuit is shown as a rectangle drawn about the designation AND and having a plurality of input terminals and a single output terminal. An OR circuit is similarly shown.

A cathode follower circuit is a tube circuit having its anode firmly tied to a potential source positive in relation to the cathode or otherwise arranged so that the grid constitutes an input and the cathode or cathode circuit constiutes an output. When the grid is UP, the cathode will go UP and when the grid is DOWN, the cathode will go DOWN. A cathode follower is not always shown since it merely acts to relay the output of some other circuit and does not alter the operations of the circuit as a whole, but when shown is in the form of a rectangle enclosing the designations CF and having a single input and a single output terminal.

An inverter is a device, shown as a rectangle about the label INV, which maintains a reversed condition between its input and its output. Normally, while the input is DOWN, the output is UP, and when the input has been driven UP, the output goes DOWN. Certain of these circuits may be combined as an OR circuit and an INV circuit which is shown as a rectangle drawn about the designation OR-INV.

A comparison circuit as used herein is one constructed and arranged from certain of the above noted fundamental circuits and is used to compare a pair of input circuits, an output being produced either when there is a mismatch of signals or a complete match of signals on the said two inputs as desired.

Figure 1:
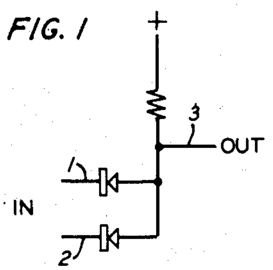
FIG. 1 is a schematic circuit diagram of the essential elements of an AND circuit.
Figure 2:
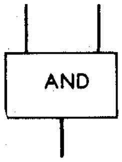
FIG. 2 is the symbol generally used for the circuit of FIG. 1.

FIG. 1 shows an AND circuit in the form that will be often used in the drawings. It will be understood that the two (or more) inputs 1 and 2 are normally connected to circuits providing a DOWN condition so that the output 3 is maintained in a DOWN condition. If either of the inputs 1 or 2 is driven UP the output 3 will still be maintained DOWN, but when all of the inputs go UP then the output 3 goes UP. An AND circuit is alternatively shown by its symbol, FIG. 2.

Figure 3:
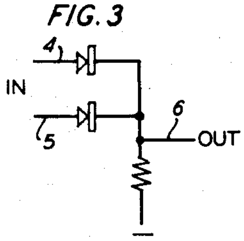
FIG. 3 is a schematic circuit diagram of the essential elements of an OR circuit.
Figure 4:
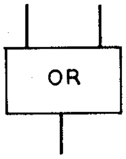
FIG. 4 is the symbol generally used for the circuit of FIG. 3.

An OR circuit is shown in FIG. 3. It will be understood that the two (or more) inputs 4 and 5 are normally connected to circuits providing a DOWN condition so that the output 6 is maintained in a DOWN condition. If any one of the inputs is driven UP then the output 6 will go UP regardless of the condition of the remainder of the inputs. An OR circuit is alternatively shown by its symbol, FIG. 4.

Figure 5:
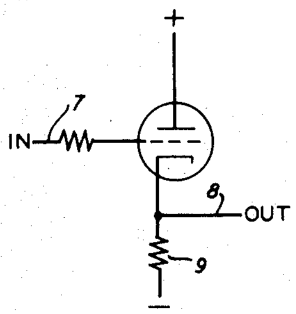
FIG. 5 is a schematic circuit diagram of the essential elements of a cathode follower circuit.
Figure 6:
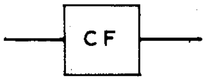
FIG. 6 is the symbol generally used for a cathode follower circuit such as that of FIG. 5.

A form of cathode follower circuit is shown in FIG. 5 and the symbol therefor is shown in FIG. 6. In this circuit, if the input 7 is DOWN the tube is not conducting and the output 8 is DOWN. When the input 7 goes UP, the tube conducts and due to the load resistor 9, the output goes UP. It will be understood that this circuit is shown in only its essential aspects, the provision of proper biasing networks being an engineering matter with which we are not at present concerned.

Figure 7:
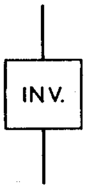
FIG. 7 is the symbol generally used for an inverter.

FIG. 7 is a symbol used for a conventional inverter whose output is arranged to be normally UP while its input is DOWN and which goes DOWN when the input is driven UP.

Figure 8:
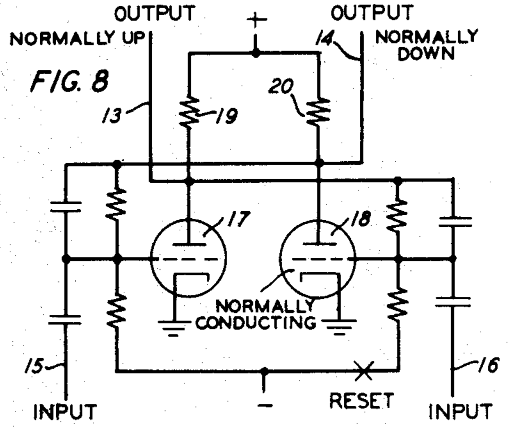
FIG. 8 is a schematic circuit diagram of a typical negative pulse operated trigger circuit, which by the connection together of its two inputs may be made to operate as a flip-flop circuit.

FIG. 8 shows the internal circuitry of a trigger, which is a bistable circuit such as a flip-flop which will remain in either of the two states to which it has been driven. It has a pair of inputs and if these are connected together and used as a common input the device will change from one condition to the other each time a negative pulse is applied to the said input. This is conventional flip-flop operation. Alternatively the two inputs may be separately controlled whereby the particular state to which the circuit is set may be controlled by the selective control of the inputs.

Figure 9:
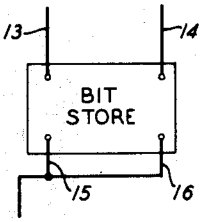
FIG. 9 is the symbol generally used for the circuit of FIG. 8 when connected to operate as a flip-flop.
Figure 10:
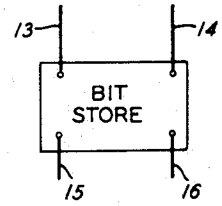
FIG. 10 is the symbol generally used for the circuit of FIG. 8 when it is arranged to be selectively driven to one or the other of its two stable states, the circuit of FIG. 8 as indicated in both FIG. 9 and FIG. 10 being employed herein as a bit store.

Since these trigger circuits are used throughout the circuitry of the present invention for the purpose of storing bits, they are shown in the drawings as bit stores as illustrated in FIGS. 9 and 10.

Attention is called to the indication of the reset means in the circuit of the grid resistor of the right hand tube. If this connection is broken, the potential of the grid will go UP and the trigger will be driven to its normal condition. Electronic means for controlling a release operation in which all such bit stores or triggers are returned to normal are shown in the said Hamilton et al. Patent 2,636,672 and is herein considered conventional.

The bit store (FIG. 9 or FIG. 10) is one of the principal elements in the Phelps invention shown in Patent 2,584,811, and is fully set forth in the Hamilton et al. Patent 2,636,672. It has two outputs, 13 and 14, and is so arranged that either one or the other is UP and the other or the one is DOWN. As shown herein, and as indicated by the label alongside the tube 18, this tube will be normally conducting and the output 13 will be normally UP while the output 14 will be normally DOWN. There are two inputs 15 and 16. Looking at the circuitry of FIG. 8 and at FIG. 10, it should be stated that if the device is in its above stated normal condition and then a signal is transmitted over the input 15, the tube 17 will be driven to conduct and the tube 18 will be restored to a non-conducting condition. A second signal on this same input 15 will cause no change. Thereafter when a signal is transmitted over the other input 16, the conditions of the tubes will be changed. Due to the load resistors 19 and 20 it will be noted that when the tube 18 is conducting, the output 13 will be UP and the output 14 will be DOWN. In like manner, when the tube 17 is conducting, the output 14 will be UP and the output 13 will be DOWN.

When the two inputs are connected together as indicated in FIG. 9, a true flip-flop action will take place, that is, the conditions of the two tubes will be changed on each of a train of pulses coming in over the common input.

It is to be noted, as fully described in the Phelps patent, that this device responds to negative pulses, so that if a positive pulse is applied to its input, the trigger acts on the trailing edge thereof, that is, the bit store is not triggered until the termination of such positive pulse.

Figure 11:
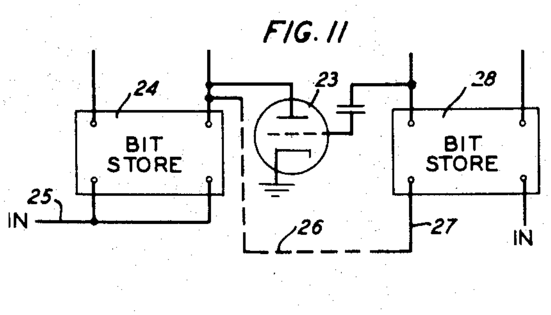
FIG. 11 is a schematic circuit diagram showing the connection made between a flip-flop such as FIG. 9, a blocking tube and a selectively operated circuit such as FIG. 10.

A blocking tube is shown as an element of FIG. 11. The tube 23 when in a conducting state will so condition a bit store 24 that it will not respond to an incoming signal over its input 25. There are circumstances where there is a virtual connection 26 between the bit store 24 and the input 27 of the bit store 28 and it is desired that when the bit store 28 is changed back to its normal state the bit store 24 be also changed back to its normal state, or at least prevented from changing to its triggered state. Therefore the blocking tube 23 is used. The complete details and the manner of the operation of such an arrangement may be found in the said Phelps patent.

Figure 12:
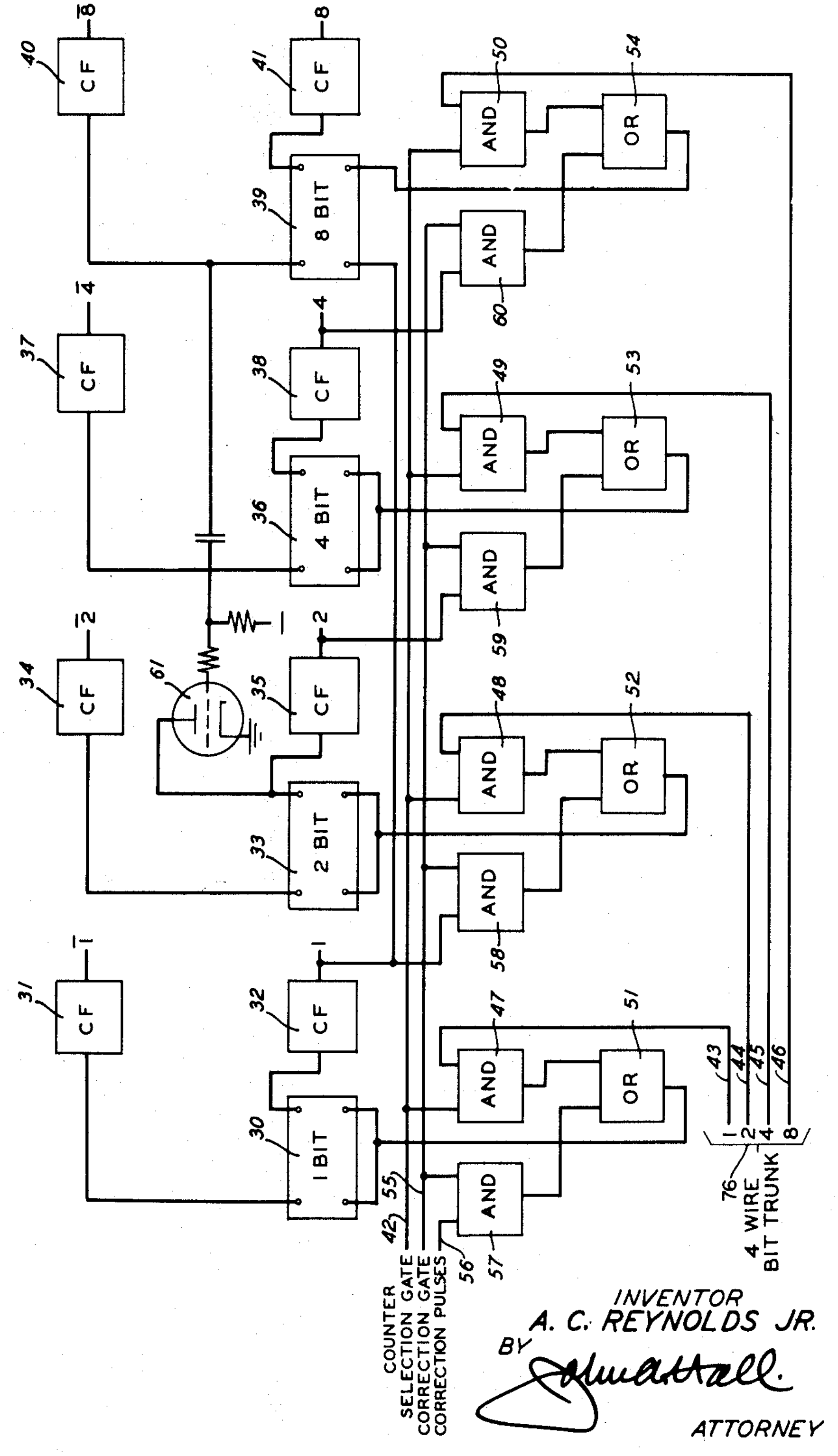
FIG. 12 is a counter register which may be set either by the concurrent transmission thereto of the four coded bits to represent a decimal number or by the transmission thereto of a train of bits, and in which a record established in either manner may be corrected by the introduction therein of a train of correction pulses.

FIG. 12 shows a single decimal digit register which may be set by the concurrent transmission thereinto of the 1, 2, 4 and 8 bits of a coded decimal digit and which may thereafter be corrected, if found to be in error, by the transmission thereinto of a train of pulses in seriatim.

This circuit component comprises four bit stores for registering the 1, 2, 4 and 8 bits of a decimal digit. The bit store 30, normally exhibits a not one bit through the cathode follower 31 and alternatively exhibits a one bit through the cathode follower 32. Likewise, the bit store 33 normally exhibits a not two bit through the cathode follower 34 and alternatively exhibits a two bit through a cathode follower 35. Again, in like manner, the bit store 36 normally exhibits a not four bit through the cathode follower 37 and alternatively exhibits a four bit through the cathode follower 38. The bit store 39 normally exhibits a not eight bit through the cathode follower 40 and alternatively exhibits an eight bit through the cathode follower 41. Thus it will be seen that in the normal condition the outputs of cathode followers 31, 34, 37 and 40 are UP and the outputs of cathode followers 32, 35, 38 and 41 are DOWN.

Now let us assume that the decimal digit 7 is transmitted into this component for registration. First, the Counter Selection Gate 42 will be driven UP and then UP conditions will appear on the 1 bit incoming circuit 43, on the 2 bit incoming circuit 44, and on the 4 bit incoming circuit 45, and a DOWN condition will be maintained on incoming circuit 46. As a result, coincidence will be established simultaneously in the AND circuits 47, 48 and 49 whereas AND circuit 50 will remain in its normal condition. As a result, OR circuits 51, 52 and 53 will show an UP condition on their outputs and bit stores 30, 33 and 36 will operate on the termination of these conditions so that the output of the component will exhibit an UP condition on its 1, 2, 4 and $\bar{8}$ outputs and a DOWN condition on its $\bar{1}$, $\bar{2}$, $\bar{4}$ and 8 outputs. This condition will be maintained indefinitely.

Now let us assume that it is discovered that the digit 7 thus registered is in error and that it must be corrected. The correction is made by first driving the correction gate 55 UP and then transmitting a train of pulses over the correction pulse circuit 56.

The first of these pulses will establish coincidence in the AND circuit 57 which in turn will transmit a pulse through the OR circuit 51 and thus operate the bit store 30 on the termination thereof so as to change its output from $\bar{1}$ DOWN and 1 UP to the opposite condition, that is, $\bar{1}$ UP and 1 DOWN. Since the output of CF 32 was UP when the correction gate 55 was driven UP, the AND circuit 58 drives the OR circuit 52 UP to eventually operate the bit store 33 and thus change the outputs from $\bar{2}$ DOWN and 2 UP to the opposite condition, $\bar{2}$ UP and 2 DOWN.

In like manner, AND circuit 59 operates through OR circuit 53 to drive the bit store 36 to change the conditions from $\bar{4}$ DOWN and 4 UP to $\bar{4}$ UP and 4 DOWN.

Also, AND circuit 60 will operate through OR circuit 54 to transmit a pulse over the right input of bit store 39 and since simultaneously therewith the output of CF 32 goes DOWN, the bit store 39 receiving a negative pulse simultaneously over both its inputs will act in the same manner as a bit store having its two inputs tied together will change its output conditions from $\bar{8}$ UP and 8 DOWN to $\bar{8}$ DOWN and 8 UP Thus, the digit 7 exhibited by this circuit component of FIG. 12 has been changed to the digit 8.

When, after the device of FIG. 12 has been driven to register the code 1001 for nine, another incoming pulse drives the 1 bit store 30 to its normal state the changing of CF 32 to DOWN transmits a negative pulse to the left hand input of bit store 39 and thus causes this bit store to also revert to its normal condition, its left hand output to the CF 40 will go UP and this positive pulse will enter the grid of the tube 61 to momentarily cause conduction therein so that the simultaneously occurring DOWN movement of the OR circuit 52 cannot trigger the 2 bit store 33. Thus the register will not continue to advance in accordance with the binary codes beyond nine but will change to the value 0000.

Thus the device will successively be driven by the train of correction pulses over the incoming circuit 56 to successively change its outputs to exhibit in turn the codes for the decimal digits 9, 0, 1, 2, 3, 4, 5 and 6. It is to be noted that there is no provision for decimal digit carries.

Figure 13:
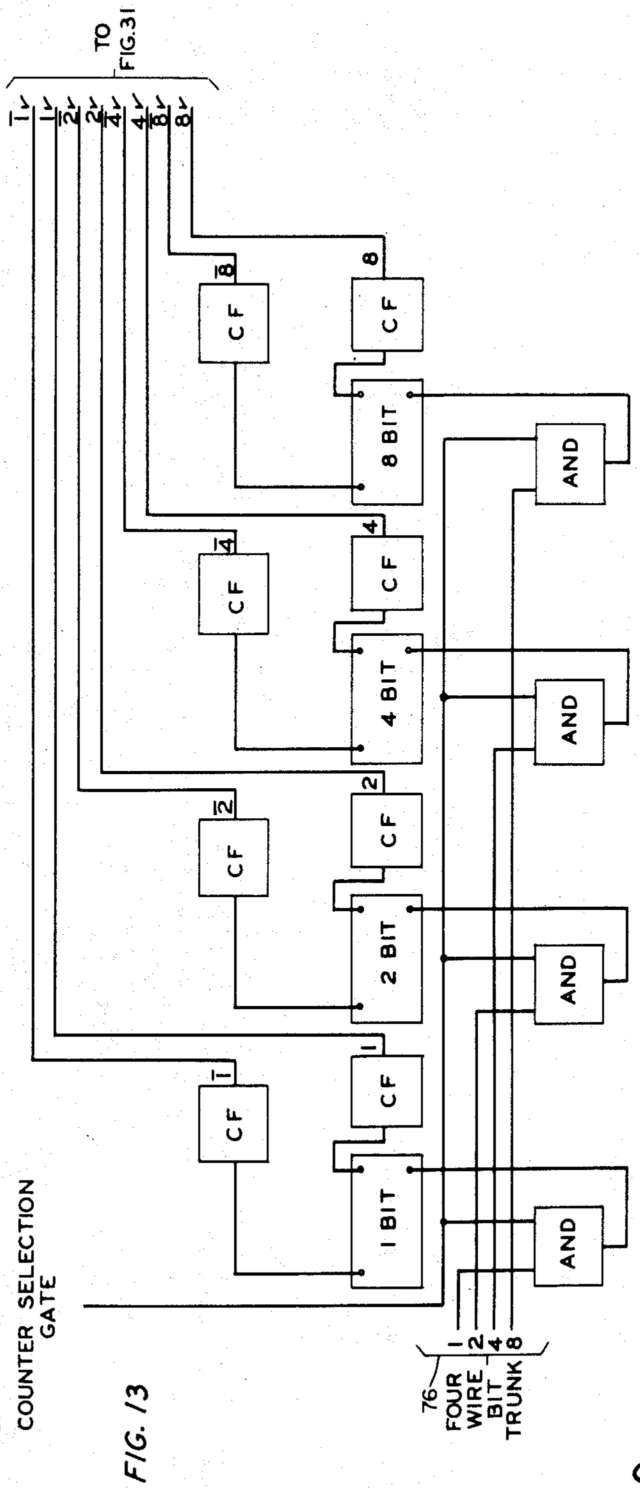
FIG. 13 is a decimal digit register into which a single decimal digit expressed in binary code (such as the predetermined sum modulo 10 check digit) may be introduced and which will thereafter need no correction.

FIG. 13 shows a single digit register fundamentally the same as that of FIG. 12, excepting that it being intended to be used merely for the registration of a single digit without any change in the registration thereafter, either by way of accumulation or correction, no means is present to provide accumulation in accordance with the principles of binary addition. A single circuit of this type is used herein to register the single check digit predetermined as the sum modulo ten of the digits of the principal number, and spoken of hereinafter as the magnitude check digit. It will be noted that each of the output bits is characterized by a subscript in the form of a check mark in order to show how this magnitude check digit may be compared to the sum modulo ten digit computed during the entry of the ten digits of the principal number and whose output bits are characterized by the subscript in the form of the Greek letter sigma. These characterized bits will be seen in the digit comparison circuit FIG. 31.

Figure 14:
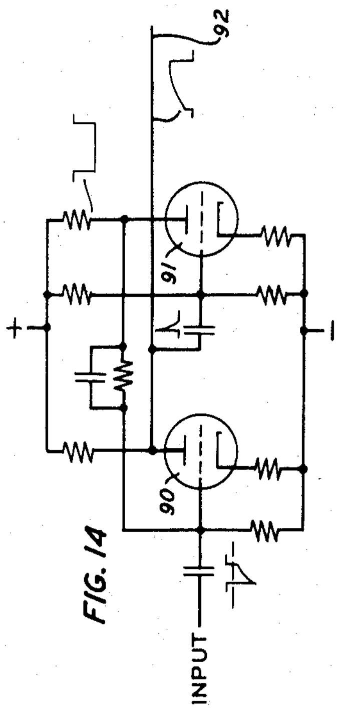
FIG. 14 is a conventional single shot vibrator employed herein as a delay and which will respond to a single impulse and produce a prolonged single output pulse.

FIG. 14 shows a single shot multivibrator used as a delay circuit and shown throughout the circuitry of the present invention as a rectangle labelled DELAY. The circuit consists of a pair of tubes 90 and 91 in which the tube 90 is normally conducting and the tube 91 normally nonconducting. The output 92 of the tube 90 is normally DOWN.

On the trailing edge of a positive signal applied to the input of this device the input condenser will momentarily depress the grid of the normally conducting tube 90 so that this will terminate the conduction of this tube with the result that its anode goes UP. This causes a momentary operation of the tube 91, whose anode is thereby depressed to prolong the nonconducting condition of tube 90. When the charge on the condenser in the grid circuit of tube 91 has dissipated, tube 91 will return to its nonconducting state and since its anode then goes UP the grid of tube 90 will go UP and terminate the delayed UP condition on the anode thereof. The duration of this delayed UP condition is determined by the value of the condenser and the resistor in the grid circuit of the tube 91 and may be adjusted to any desired value.

Such a time delay circuit may be used as described hereinafter to produce an UP condition upon the termination of some other UP condition.

One of the operations, as set forth hereinbefore, is to translate the four digit decimal number expressing the value of the binary number recorded as the check digits. It will be remembered that the recorded number and the check digits, by way of example, were

763591283007544 when considering the odd or even characteristics of these decimal digits. In order to locate an error the four digit number 0754 must be translated into the binary number

1011110010

Each of the four digits then appears on the four wire bit trunk in seriatim and each must first be translated from a four place coded expression of a decimal digit to a single wire signal on one of nine wires, for which purpose a conventional four to nine wire converter is used. Such a device is shown in FIG. 15 where the counter selection gate 65 acts to enable the device, so that the bits transmitted over the four wire bit trunk will pass through this maze and emerge on some one of the outputs 1 to 9 inclusive.

Figures 15, 16:
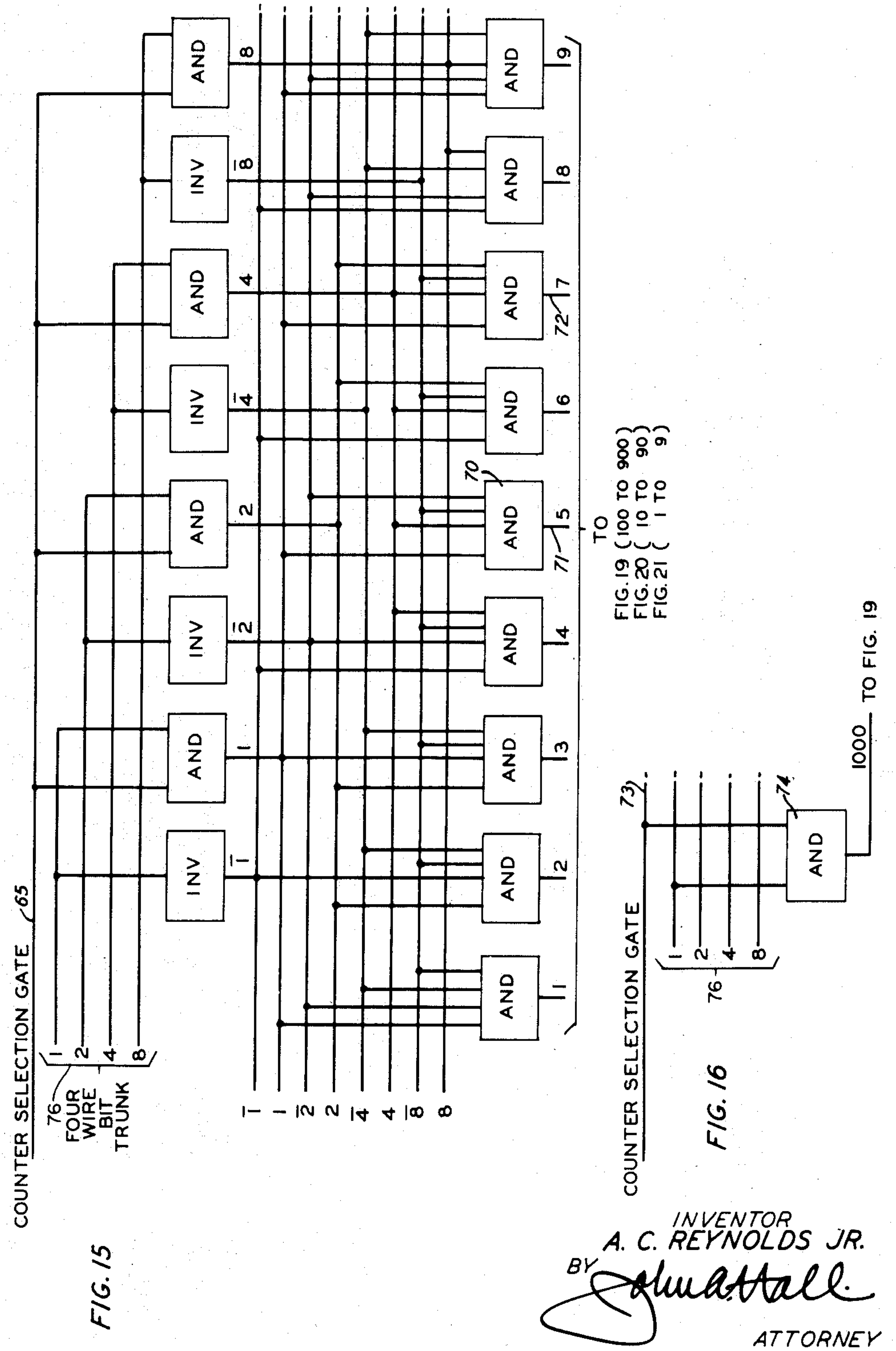
FIG. 15 is a four to nine wire converter used herein to translate the binary coded decimal digits of the check number to a single signal on one of nine wires representing nine of the decimal values.
FIG. 16 is a simple gate circuit used in the same situation as the four to nine wire converters of FIG. 15 since in the present example the thousands digit of the location check number will never be of greater value than one.

No register is used in FIG. 15 since the bits transmitted over the four wire bit trunk 76 are registered after translation in the bit stores shown in FIGS. 19, 20 and 21. Since the four digits 0754 are transmitted in seriatim, they are translated in four circuits 66, 67, 68 and 69 (FIG. 33) from the 1, 2, 4 and 8 bit code to single wire decimal representations before entering the decimal to binary translator of FIGS. 19 to 21. It will appear that the decimal to binary translator must act in some respects as an adder since the values 0000, 0700, 0050 and 0004 are successively entered therein and the output from the registration of the value 0700, by way of example, must be changed upon the registration of the succeeding value 0050 and this may involve carries.

The four to nine wire converter shown in FIG. 15 therefore translates the incoming 1, 2, 4 and 8 bit coded decimal digits into $\bar{1}$, 1, $\bar{2}$, 2, $\bar{4}$, 4, $\bar{8}$ and 8 bit representations wherefrom the single wire decimal signals are derived. By way of example, when the decimal digit 5 is transmitted over the 4 wire bit trunk it will be expressed by a 1 and a 4 bit so that in the network of the four to nine wire converter UP conditions will be established on the 1, $\bar{2}$, 4 and $\bar{8}$ conductors whereby coincidence will be established in the AND circuit 70 and a signal will be transmitted over the 5 value output wire 71.

As a further example, when the second digit 7 of the four digit check number is transmitted, then the 7 value output wire 72, representing the value 700 in the converter 67, will be transmitted.

Since, in the present embodiment of the invention, no thousands digit will ever exceed the value 1, a simple gate circuit (66 in FIG. 33) such as that shown in FIG. 16 may be used. This consists of the AND circuit 74 controlled by the counter selection gate 73 and an incoming 1 bit to transmit a bit over the 1000 value output.

Before going on a detailed description of other circuit components it is believed to be helpful to have a general understanding of the organization of such details and how they are made to cooperate. This may be followed from FIG. 33. A word, by way of example, a ten digit number with its check digits, a four digit position check number which is the translation of a ten place binary number derived from the said ten digit number, and a single digit magnitude check number which is the modulo 10 value of the sum of the said ten digits, is moved over a four wire bit trunk 76 digit by digit. A conventional ring circuit 77 responds and sequentially closes fifteen gate circuits so that each of the fifteen digits is in turn directed into and registered by one of fifteen corresponding storage units. The first ten of these storage units are each in accordance with FIG. 12 and will receive and register a digit whose coded bits are transmitted thereinto concurrently. As the fifteenth digit is registered it will be known whether or not the word now registered is correct or is in error. If it is correct, then the ten digits of the word may immediately be transferred to a use circuit 78 and the operation of the device in which said word is to be used will continue without interruption.

It will be noted that the four wire bit trunk 76 enters a decimal digit accumulator 79 which operates during the transmission of the ten digits of the word proper to derive the modulo 10 value of the sum of these digits which should correspond exactly to the fifteenth digit of the word. This sum modulo 10 value is derived during the registration of the said ten digits and the comparison of this with the fifteenth digit of the word is made in the comparison circuit 80. If the comparison is correct, then a control signal over the circuit 110 will drive the bit store 106 (FIG. 23) to normal and this will relax the control signal over the circuit 82. The control 81 for the use circuit 78 is in parallel with the circuit 110 and hence will go UP as 82 goes DOWN so that the registered word may be transferred.

The 11th, 12th, 13th and 14th digits registered (0754, by way of example) are transmitted to a decimal to binary translator 83 where the binary equivalent (1011110010) is formed and this is compared in the digit position comparison circuit 84 with the outputs of the 1 bit stores appearing at the outputs of the first ten storage units. Carrying out the example, it will be found that the comparison circuit shows the number

1111110010 compared to

1011110010 whereupon it appears that an error exists in the second place, that is, the number registered in the storage device 85 is not what it should be. This results in the enabling of the correction gate to this storage device 85 and the transmission thereto of a train of pulses to advance the count therein until the proper value is attained, evidenced both by the output of the digit position comparison circuit 84 and the output of the comparison of the sum modulo 10 and check digit circuit 80. It will be understood that a single pulse will bring a comparison in the circuit 84 but a comparison in the circuit 80 being on a decimal basis will not come until a sufficient number of pulses have been gated into both the storage unit 85 and the accumulator 79 to change the first from a seven to a six and in the latter to change a five to a four.

When both comparison circuits 84 and 80 become satisfied, control signals are transmitted to the use circuit 78 and the corrected word is transferred for use.

Figure 17:
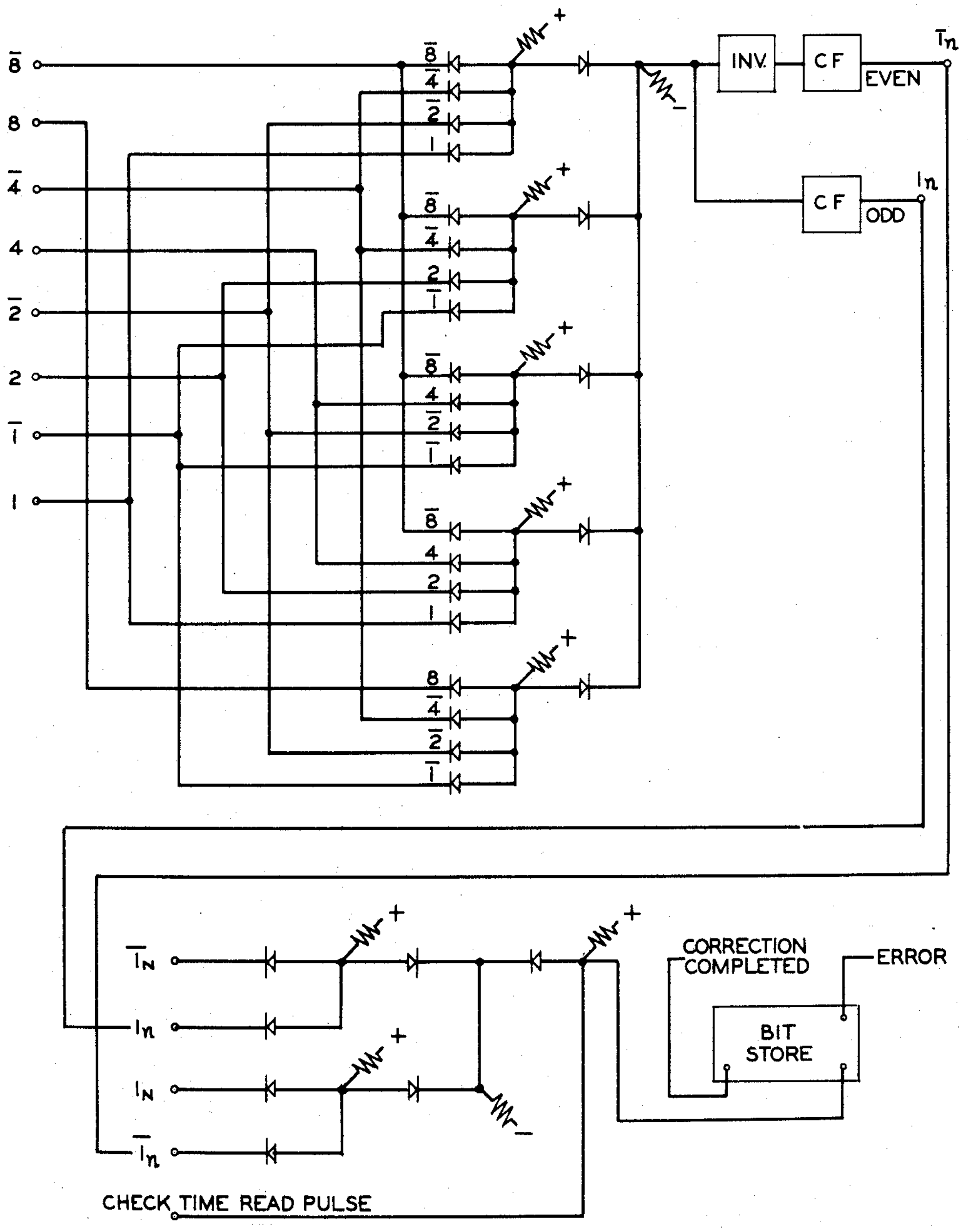
FIG. 17 is a schematic circuit diagram showing a parity check forming circuit feeding in to a section of a position check comparison circuit such as that of FIGS. 23 and 24.

Another form of the invention is shown in FIG. 34, in which the device of FIG. 17 is used to derive a parity bit for each decimal digit. Thus each storage unit, such as 85, besides registering the decimal digit as it is transmitted over the four wire bit trunk 76 and as it is later corrected by the opening of the gate 55 to admit the correcting pulses, also feeds its output into the parity bit circuit 10. Thus the four digit position check number 0540 will be translated in the decimal to binary translator 83 to the binary number

1000011100 and compared in the digit position comparison circuit 84 with the binary number

110001110 whereupon, as before, an error in the second place is shown to exist. The correction is made, as before, that is, the gate 55 is opened and a sufficient number of correcting pulses from the source 11 are simultaneously fed into the storage unit 85 and into the decimal digit accumulator to make the required corrections.

With this general understanding of the cooperative functioning of the components of the present invention, let us now examine the operation of the separate components.

The operation of the separate storage units, such as the unit 85, has been set forth hereinbefore. Also the translation of the four decimal digits (the 11th, 12th, 13th and 14th digits of the word) from the four bit coded form to single signal form through the four to nine wire converters has been explained.

Now, looking at FIGS. 19, 20 and 21, arranged as indicated in FIG. 18, it will be noted that among the incoming wires there is one marked 1000 (the output of a circuit such as FIG. 16), and others marked 100 to 900 inclusive, 10 to 90 inclusive, and 1 to 9 inclusive (the outputs of three circuits such as that shown in FIG. 15). These 28 input wires lead into a matrix by which a ten place binary number will be produced as an output.

It should be noted that the output of this device is built up step by step, since the digits of the four digit check number 0754 are entered separately in that order.

Before the entry of any one of these digits the output of the device stands at

| 512 | 256 | 138 | 64 | 32 | 16 | 8 | 4 | 2 | 1 | (Bits) |
|---|---|---|---|---|---|---|---|---|---|---|
| 0 | 0 | 0 | 0 | 0 | 0 | 0 | 0 | 0 | 0 | |

Upon the entry of the thousands digit 0, this record remains 0 0 0 0 0 0 0 0 0 0

Upon the entry of the hundreds digit 7, this record becomes 1 0 1 0 1 1 1 1 0 0

Following this, the tens digit 5 is entered, so the following sum is performed

```
1 0 1 0 1 1 1 1 0 0
0 0 0 0 1 1 0 0 1 0
-------------------
1 0 1 1 1 0 1 1 1 0
```

Following this the units digit 4 is entered, so the following sum is performed

```
1 0 1 1 1 0 1 1 1 0
0 0 0 0 0 0 0 1 0 0
-------------------
1 0 1 1 1 1 0 0 1 0
```

In the first of these summing operations two carries were required, one from the 16 bit place to the 32 bit place and another from the 32 bit place to the 64 bit place.

Upon the transmission of the twelfth digit through the four to nine wire converter 67, the output wire 75, marked 700, will carry a signal which will pass through several OR circuits, including the OR circuit for the *f* binary place whose output is designated 86 in FIG. 20. This will operate the bit store 87 and through the CF 88 will place an UP condition on the $1_f$ bit 89.

Similarly UP conditions will be placed on the $1_a$, $\bar{1}_b$, $1_c$, $\bar{1}_d$, $1_e$, $1_f$, $1_g$, $1_h$, $\bar{1}_i$, and $\bar{1}_j$ outputs.

Upon the transmission of the next digit (5) through the converter 68, the 50 wire designated 93 in FIG. 20 will be used for the transmission of another signal and this also will pass through the OR circuit whose output is marked 86 to operate the 16 bit store 87, this time to its normal state. However, it is to be noted that this signal produces a DOWN condition on the output of CF 88, which will trigger the DELAY 95, whereby a binary carry is produced.

If at the time a signal is being delivered through the circuit 99 to the bit store 100, a carry is also being produced by a lower order, this bit store will be triggered to one state or the other and then in an interval measured by the DELAY 95, will be triggered again by this carry delivered through the CF 96 to another input of the OR circuit 99.

It is believed that this short description of one carry operation will make the complete operation of the decimal to binary translator clear.

The output of the decimal to binary translator is transmitted to the digit position comparison circuit FIGS. 23 and 24 where the comparison is double checked. To carry on our example where it is assumed that a random error in the second place digit has changed a six into a seven, we will examine the state of the OR circuit 101.

The two inputs to this OR circuit are derived from the AND circuits 102 and 103. The AND circuit 102 compares the $\bar{1}_B$ output of the digit store 85 with the $1_b$ out-output of the decimal to binary translator. Since the output of the digit store 85 now shows a 1 bit (in error), the $\bar{1}_B$ will be DOWN and since the decimal to binary translator shows a 0 in its 1 bit place, the $1_b$ will be DOWN. Therefore there is no output from the AND circuit 102. By the same token, both $1_B$ and $\bar{1}_b$ will be UP and therefore there will be an output from AND circuit 103. This is enough to supply an output from OR circuit 101 whose output is one of the inputs of AND circuit 104. Therefore when the check time read pulse coming in over conductor 105 is transmitted over the other input of this AND circuit 104, a pulse will be transmitted to the bit store 106 and upon the termination thereof the CF 107 will establish an UP condition on the number 2 counter (storage unit 85) correction gate 55 (FIG. 12).

It is believed to be obvious that where the two digits to be compared are identical, then coincidence is denied in both the AND circuits used for double checking this condition so that none other of the bit stores in the group including the bit store 106 will be operated.

It has been set forth hereinbefore that a single error may be located and corrected but that the simultaneous occurrence of more than one error is what is termed a non-correctable error for the magnitude check digit cannot properly express more than one value at a time. Therefore each counter correction gate, such as the gate 55, has a connection through an OR circuit 108 to a conductor 82 leading to any conventional alarm or display device. This conductor 82 is shown herein as leading into the circuits of FIGS. 31 and 32 where it cooperates with other circuits so as to produce a satisfaction signal on the control conductor 81 (a multiple of the correction completed conductor 110 leading in to FIG. 23). When but a single error has occurred and this is corrected in the manner set forth, the correction completed pulse will be transmitted over the conductor 110 and this will operate the bit store 106 back to its normal state and remove the UP condition from the counter correction gate 55.

It has thus been shown how the 11th, 12th, 13th, and 14th digits of the number have been successively passed through the circuits 66, 67, 68 and 69 respectively, been translated into a ten place binary number in the decimal to binary translator 83 (FIGS. 19, 20 and 21) and by comparison in the digit comparison circuit 84 (FIGS. 23 and 24) has resulted in an UP condition on one of the counter correction gates 55. This gate, as hereinbefore described, will act to admit correction pulses to the storage device 85 and the comparison circuit 80 will supervise the correction and signal the circuit 84 when the correction has been completed (correction completed conductor 110 from FIG. 23). A branch 81 of this correction completed conductor 110 may be used for the transmission of the satisfaction signal to the use circuit 78 (FIG. 17).

*The sum modulo 10 computer*

This computer functionally consists of three essential parts, a binary accumulator, a translator and adder for translating the output of the binary accumulator into a pair of decimal values and for adding these decimal values, and a translator for converting the units digit of the sum of these values to its expression in the binary code $\bar{1}$, 1, $\bar{2}$, 2, $\bar{4}$, 4, $\bar{8}$, 8 herein characterized by the subscript the Greek letter sigma. It will be shown hereinafter how these bits (from FIG. 27) are compared in FIG. 31 with the corresponding bits of the magnitude check digit characterized by the subscript check mark registered in FIG. 13.

Figure 26:
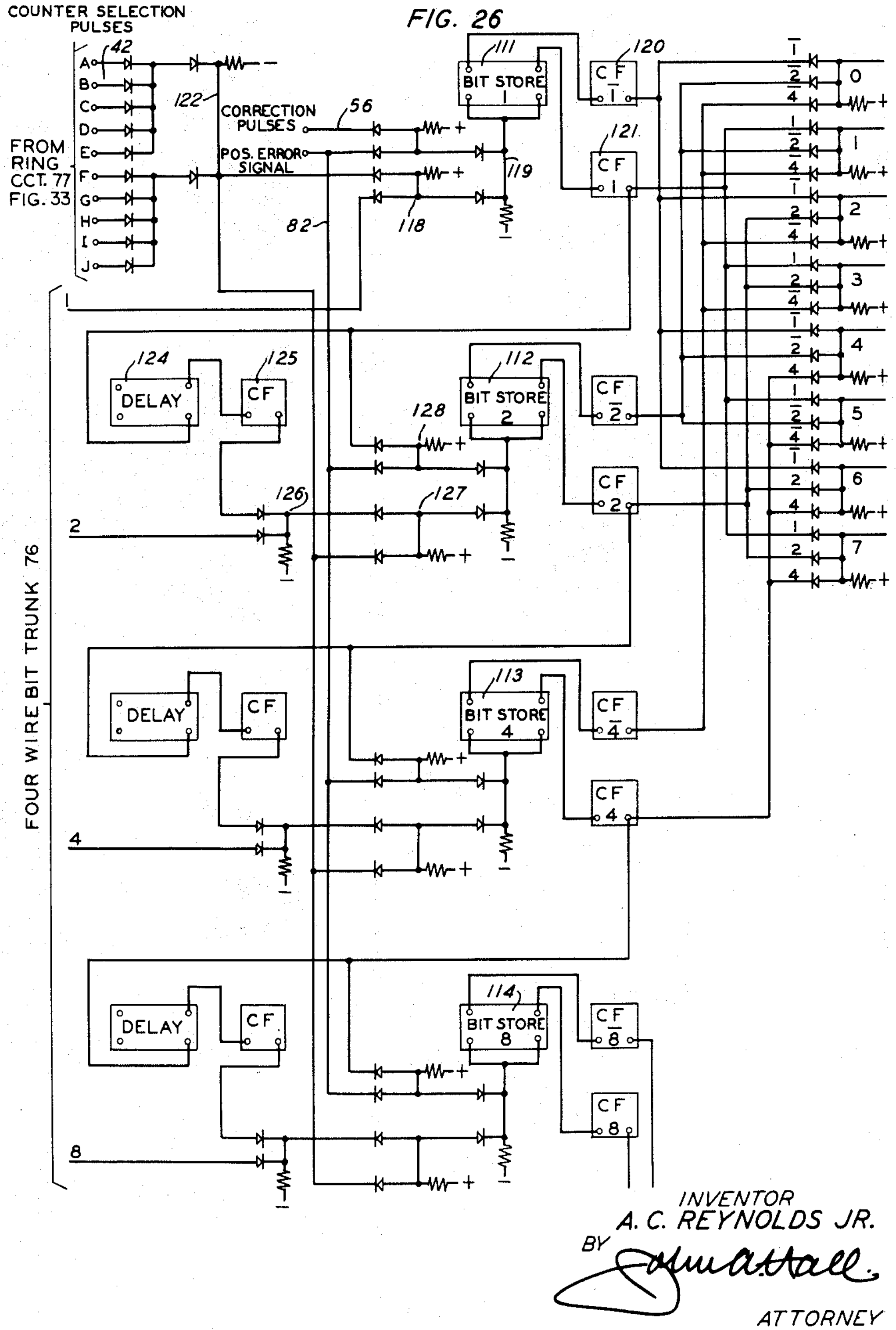

The binary accumulator, shown in FIGS. 26 and 28, comprises seven bit stores, the 1 bit store 111, the 2 bit store 112, the 4 bit store 113, the 8 bit store 114, the 16 bit store 115, the 32 bit store 116 and the 64 bit store 117. The first four of these may be directly set by incoming bits transmitted over the four wire bit trunk 76, but the last three are set solely by way of carry.

As each digit of the number is transmitted successively over the four wire bit trunk 76, the ring circuit 77 will successively operate the counter selection gates such as the gate 42 for the second storage unit 85. This gate signal will pass through the OR circuit 122 and bring UP one input of each AND circuit such as the AND circuit 118 so that if simultaneously a 1 bit is transmitted then one input of the OR circuit 119 will go UP and on the termination of this pulse the bit store 111 will change the UP condition for the $\bar{1}$ bit through the CF 120 to an UP condition for the 1 bit through the CF 121. In this manner any decimal digit expressed in the 1, 2, 4 and 8 bit binary code may be registered in the bit stores 111, 112, 113 and 114 respectively.

Provision is made for carries. If the 1 bit store 111 has been operated to exhibit an output of a 1 bit, then when another bit is entered so that by binary addition the bit store 111 is driven back to 0, the movement of CF 121 to DOWN resulting therefrom means that the DELAY 124 will be triggered and the output of CF 125 will deliver a carry pulse through OR circuit 126 to the next in order bit store 112.

It may be noted that the DELAY 124 is used when the AND circuit 127 is activated by the counter selection gates through conductor 122. If, however, the conductor 122 is DOWN and the conductor 82 alternatively is UP, as when a position error has been found, then the AND circuit 128 is activated and the carry from CF 121 is introduced into the 2 bit store 112 without delay. This may be explained as the result of the correction operation which is introduced only into the 1 bit store 111 over the correction pulse conductor 56.

In like manner, the carry input to the higher order bit stores, such as the 32 bit store 116, comes directly from the CF circuit for the 16 bit store 115 into the bit store 116 without delay.

It will thus be seen that as the ten decimal digits are successively transmitted over the four wire bit trunk 76 the sum of their values will be accumulated in this array of seven bit stores and that subsequently when a correction is found necessary and the position error signal circuit 82 is brought UP, the sum accumulated may be increased by the number of correction pulses transmitted over the circuit 56.

Now the output of the 1, 2 and 4 bit stores 111, 112 and 113 respectively are combined in a matrix of AND circuits shown in the upper right portion of FIG. 26, to derive sums, as indicated of 0, 1, 2, 3, 4, 5, 6 and 7. Likewise the output of the 8, 16, 32 and 64 bit stores 114, 115, 116 and 117 respectively are combined in a matrix of AND circuits shown to the right in FIG. 28 to derive the sums 0, 8, 16, 24, 32, 40, 48, 56, 64, 72, 80 and 88 and these in turn are combined in accordance with the units digits thereof by a plurality of OR circuits shown to the left of FIG. 29 to derive the values 0, 2, 4, 6 and 8. We thus have two groups of intermediate values, one having the values 0 to 7 inclusive and the other having the even digits 0 to 8 inclusive.

Figure 27:
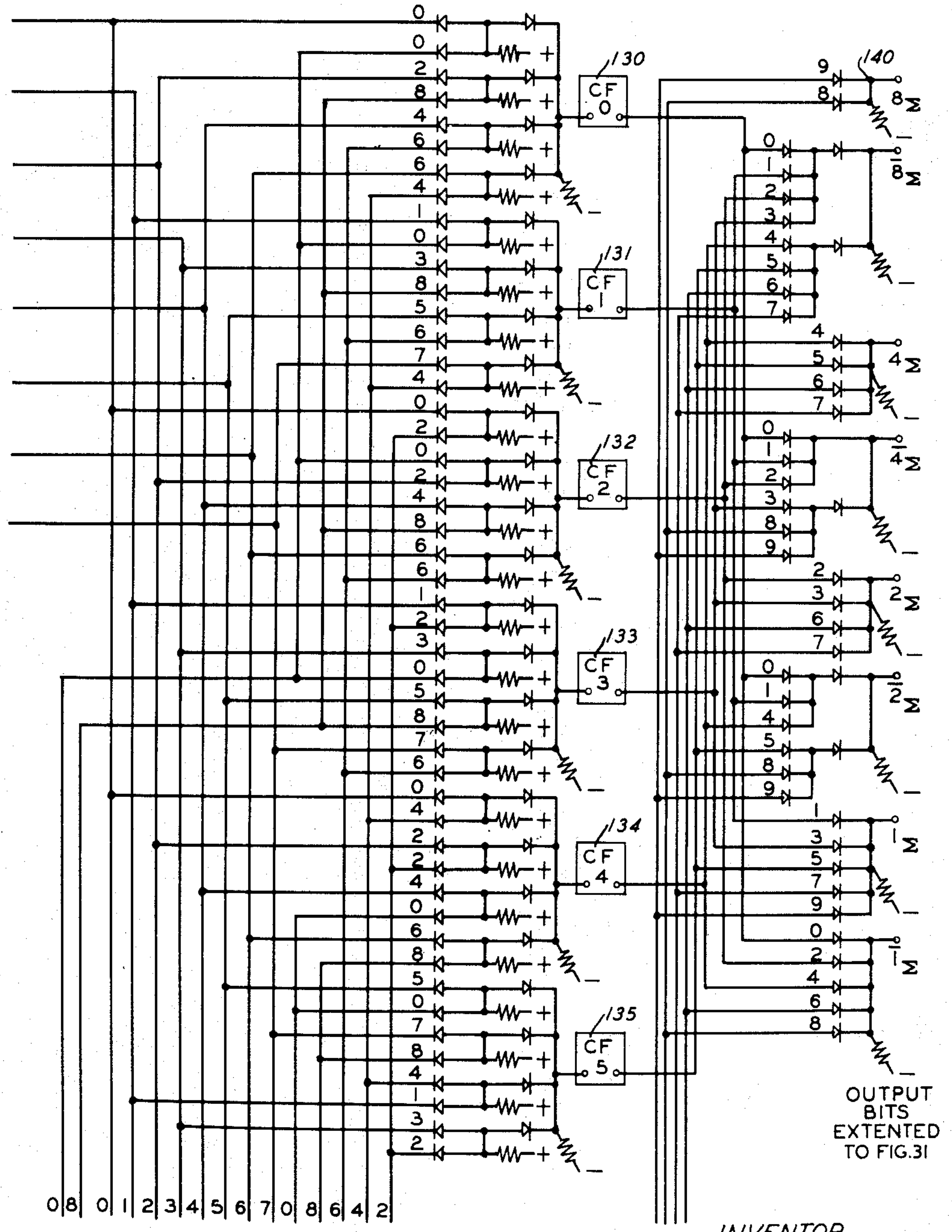
Figure 29:
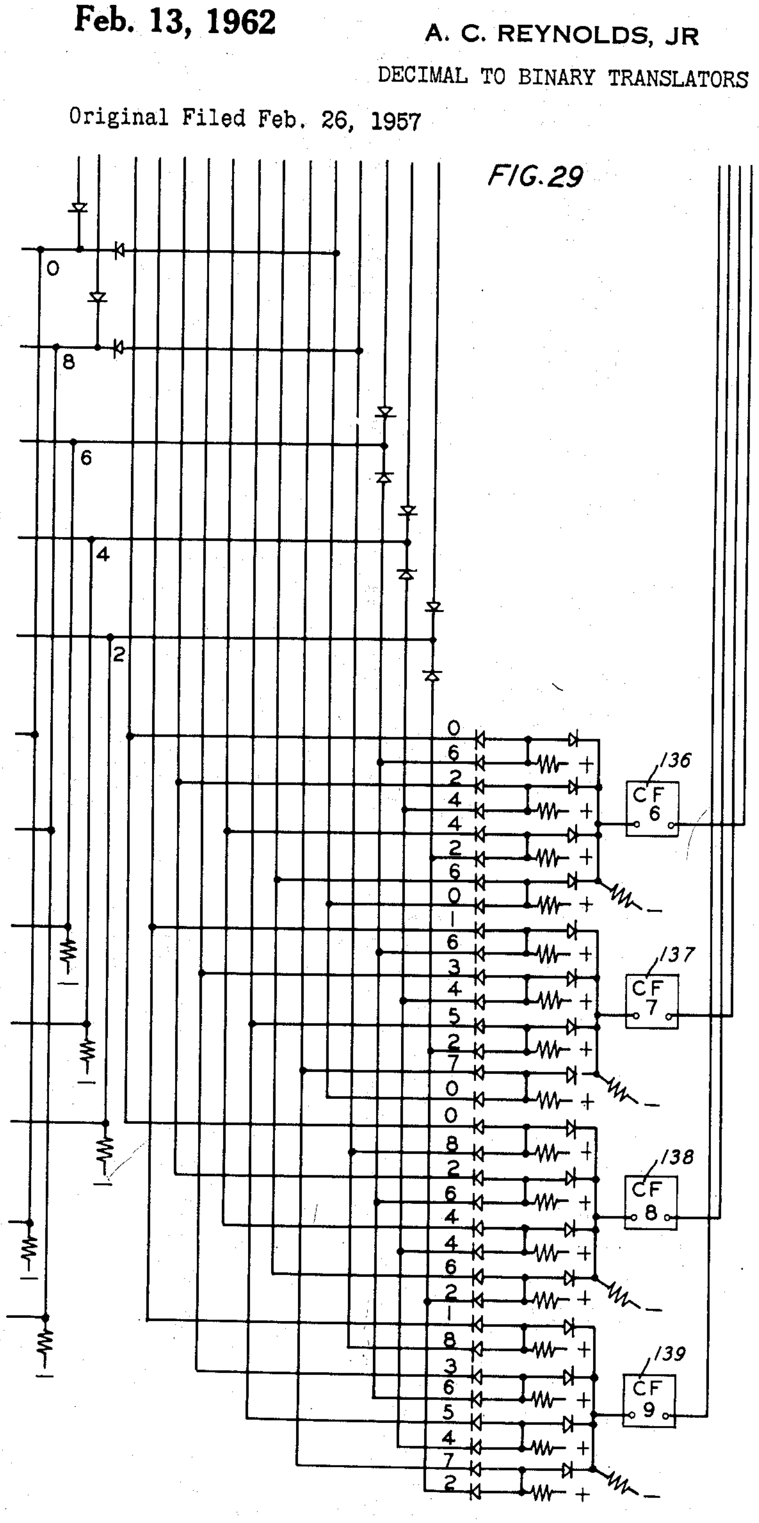

In a plurality of AND circuits shown down the middle of FIGS. 27 and 29 these values, one from each group, are combined to derive the sum modulo 10 values 0 to 9 inclusive as indicated by the CF circuits 130 to 139 respectively. It will be noted by simple inspection that the sum of the values of the two inputs of each of these AND circuits has a units value equal to the value shown in the symbol for the CFs 130 to 139 respectively.

Thereafter the outputs of these CF circuits pass through another matrix of OR circuits, such as the OR circuit 140, to derive the output bits, $\bar{1}$, 1, $\bar{2}$, 2, $\bar{4}$, 4, $\bar{8}$ and 8 each characterized by the subscript, the Greek letter sigma. These bits comprise the output of the sum modulo 10 accumulator and they are extended into the circuits of FIG. 31 for comparison with the output bits of the magnitude check digit (FIG. 13).

*Magnitude check digit comparison*

Looking now at FIG. 31 it will be seen that there are two matrix arrays for the comparison of the outputs of FIGS. 13 and 27. In accordance with principles hereinbefore explained, it will be apparent that the upper one of these arrays terminating in the OR circuit 141 will produce an output consisting of an UP condition whenever there is a mismatch between the digits expressed by FIGS. 13 and 27. In other words, an output from this array is a signal that the two digits are not alike and therefore upon the transmission of the check time read pulse (which may be transmitted by the ring circuit 77 following the setting of the check digit storage unit FIG. 13) the AND circuit 142 will be activated to drive the bit store 143 to the condition where there is no output on the correction completed conductor 110 or on the conductor 81.

It may be noted that if there is a perfect match between the digits being compared at the end of the operation of the ring circuit 77, then the bit store 143 will be left in its normal condition and a satisfaction signal will be transmitted over the conductor 81 to activate the use circuit.

The second comparison matrix terminating in the AND circuit 144 gives an opposed output, that is, it produces an UP condition at the output of the AND circuit 144 only when a perfect match between the bits of the digits being compared has been reached. Therefore, if there has been a mismatch it is not until the correction pulses have been transmitted into the sum modulo ten accumulator and the output thereof has been driven to exact equality with the record of the magnitude digit (FIG. 13) that the AND circuit 144 produces an output. Thereupon, through the AND circuit 145 the bit store 143 is triggered to return to its normal condition where it will transmit the correction completed signal over conductor 110 and the satisfaction signal over conductor 81.

FIGS. 31 and 32 additionally show the means for reporting non-correctable errors. There are several situations in which an error cannot be corrected as follows.

When the magnitude check digit reports a difference but the digit position comparison circuit shows no error, a non-correctable error exists. This situation may come about where only one characteristic of the digits of the number is being examined and where the error appears in another characteristic. The main premise of one example herein given is that the odd or even characteristics of the number (the 1 bit of each code) are being taken into consideration. If it happens by random error that some one of the 2 bits or the 4 bits should be affected, then the sum modulo ten would be changed but the position error check digits would remain the same. This, of course, can be avoided by using the parity bit network when the odd or even characteristics of the sum of the bits is employed. In the first example, then, there is a mismatch between the magnitude check digit and the output of the sum modulo ten accumulator, an UP condition will appear on conductor 146 and this through CF 147 will bring one input of the AND circuit 148 UP. Since the position error signal on conductor 82 is DOWN, the output of inverter 149 is UP whereby an UP condition is transmitted over conductor 150 which constitutes one input of the OR circuit 151. OR circuit 151 feeds into one input of the AND circuit 152 so that upon the occurrence of the check time read pulse the bit store 153 will be driven to exhibit an UP condition transmitted through the CF 154 to the non-correctable error lead 155. This may connect to any conventional alarm means.

Another type of non-correctable error is where the comparison circuit 80 is satisfied so that an UP condition is brought in on conductor 156, passed through the CF 157 and feeds into AND circuit 158. If at this time an UP condition appears on one of the counter correction gates, conductor 82 will be UP and another input of the OR circuit 151 will be affected. This may happen where multiple errors in several of the storage units occur and the sum modulo ten accumulated remains the same because the sum is actually changed by 10 or some multiple thereof, or not at all.

A third type of non-correctable error is presented where any two or more counter correction gates are in error. By way of example, if errors appear in storage units 2 and 4, then UP conditions on the number 2 correction gate will affect one input of AND circuit 159 and the UP condition on number 4 correction gate will be passed through the OR circuit 160 to the other input of AND circuit 159 to place an UP condition on the wire 161 another input to the OR circuit 151.

It is believed to be apparent from a simple scrutiny of FIG. 32 how any other combination of two such signals will bring the non-correctable error alarm.

What is claimed is:

1. A decimal to binary translator comprising a multiple wire bit trunk for successively transmitting thereover a plurality of decimal digits, a matrix for translating said decimal digits into a binary number, bit stores for each order of said binary number and delay means between said bit stores to accommodate carries produced in the step by step entry of said decimal digits.

2. Means for translating a multidigit decimal number into an equivalent binary number, comprising means for entering the digits of said number into said means in seriatim, a plurality of bit stores for registering the bits of the said binary number, a matrix consisting of decimal arrays of incoming leads for each decimal digit interconnected to said bit stores and carry means interconnecting said bit stores arranged to alter the pattern of operation of said bit stores in accordance with the principles of binary addition during the successive entry of said decimal digits.

3. Means for translating a multidigit decimal number into an equivalent binary number, comprising means for entering the digits of said number into said means in seriatim, a plurality of bit stores for registering the bits of said binary number, a matrix consisting of groups of decimal value incoming leads for each decimal digit interconnected to said bit stores, and carry means interconnecting said bit stores arranged to alter the pattern of operation of said bit stores in accordance with the principles of binary addition during the successive entry of said decimal digits.

4. Means for translating a multidigit decimal number into an equivalent binary number wherein said decimal digits are each expressed in binary code and are transmitted to said means in seriatim, a means for each digit of said number for translating the said incoming expression thereof from a simultaneously transmitted plurality of binary bits to a single signal on a corresponding one of nine decimally equivalent valued output wires, a plurality of bit stores comprising the output means of said translating means, a matrix consisting of means for interconnecting said decimally valued output wires and said bit stores and carry means interconnecting said bit stores arranged to alter the pattern of operation of said bit stores in accordance with the principles of binary addition during the successive entry of said decimal digits.

5. A decimal to binary translator having inputs for decimal units values 1 to 9 inclusive, tens values 1 to 9 inclusive, hundreds values 1 to 9 inclusive, and thousands value 1, a plurality of bit stores one for each bit of a ten place binary number, each said bit store having a bit and a no bit output, carry means between said bit stores to enable accumulation in accordance with the principles of binary addition, and a matrix of connections between said decimal inputs and said bit stores arranged in accordance with the principles of decimal to binary translation.

6. A decimal to binary translator having inputs for decimal units values 1 to 9 inclusive, tens values 1 to 9 inclusive, hundreds values 1 to 9 inclusive, and thousands value 1, a plurality of bit stores one for each bit of a ten place binary number, each said bit store having a bit and a no bit output, carry means between said bit stores to enable accumulation in accordance with the principles of binary addition and a matrix of connections and OR circuits between said decimal inputs and said bit stores arranged in accordance with the principles of decimal to binary translation.

7. A decimal to binary translator consisting of a multiple wire bit trunk for successively transmitting thereover the separate digits of a decimal number, counting means for counting said digits, means responsive to said counting means for successively connecting said trunk to a plurality of translating devices, each said device having a first translating means responsive to a plurality of bits simultaneously received over said bit trunk for selectively activating one of nine decimally designated bit store translator matrix inputs, said inputs being designated 1 to 9 respectively, for a said first translator means provided for the units digit of said decimal number, being designated 10 to 90 respectively, for a said translator provided for the tens digit of said decimal number, being designated 100 to 900 respectively, for a said translator provided for the hundreds digit of said decimal number and being similarly designated for translators for higher order digits of said decimal number, a plurality of bit stores each for storing a binary number bit having a value corresponding to the decimal numbers $2^0$, $2^1$, $2^2$, $2^3$, $2^4$, and so on, said translator matrix inputs each being connected to and provided with means to operate said bit stores in combinations, the sum of whose values is equal to the designation of said decimally designated bit store translator matrix input.

References Cited in the file of this patent

UNITED STATES PATENTS

| | | |
|---|---|---|
| 2,473,444 | Rajchman | June 14, 1949 |
| 2,620,974 | Valtat | Dec. 9, 1952 |
| 2,658,166 | Depp | Nov. 3, 1953 |
| 2,940,669 | Hobbs | June 14, 1960 |
| 2,961,169 | Bell et al. | Nov. 22, 1960 |